(12) United States Patent
Verkasalo

(10) Patent No.: US 12,212,471 B2
(45) Date of Patent: Jan. 28, 2025

(54) SYSTEMS AND METHODS FOR BEHAVIOURAL AND CONTEXTUAL DATA ANALYTICS

(71) Applicant: The Nielsen Company (US), LLC, New York, NY (US)

(72) Inventor: Hannu Verkasalo, Espoo (FI)

(73) Assignee: The Nielsen Company (US), LLC, New York, NY (US)

(*) Notice: Subject to any disclaimer, the term of this patent is extended or adjusted under 35 U.S.C. 154(b) by 146 days.

(21) Appl. No.: 17/986,702

(22) Filed: Nov. 14, 2022

(65) Prior Publication Data

US 2023/0071831 A1    Mar. 9, 2023

Related U.S. Application Data

(63) Continuation of application No. 16/352,144, filed on Mar. 13, 2019, now Pat. No. 11,502,914, which is a
(Continued)

(51) Int. Cl.
*G06F 16/00* (2019.01)
*G06F 9/455* (2018.01)
(Continued)

(52) U.S. Cl.
CPC ............ *H04L 41/147* (2013.01); *G06F 9/455* (2013.01); *G06F 16/26* (2019.01);
(Continued)

(58) Field of Classification Search
CPC ...... G06F 16/9535; G06F 16/26; G06F 9/455; G06Q 10/0637; G06Q 10/06; H04L 41/147
See application file for complete search history.

(56) References Cited

U.S. PATENT DOCUMENTS

| 4,099,591 A | 7/1978 | Carr |
| 4,361,851 A | 11/1982 | Asip |

(Continued)

FOREIGN PATENT DOCUMENTS

| CN | 1776694 A | 5/2006 |
| CN | 101040242 A | 9/2007 |

(Continued)

OTHER PUBLICATIONS

Haitsma et al., "A Highly Robust Audio Fingerprinting System," IRCAM, 2002, 9 pages.

(Continued)

*Primary Examiner* — Yicun Wu

(57) ABSTRACT

System and method for behavioral and contextual data analytics are disclosed. An example computer system to process observational data received from a wireless device includes a memory including machine readable instructions and a processor to execute the instructions to: process the observational data to identify temporally adjacent applications to generate usage metric data, the observational data including application usage data; build a behavior model based on the identified temporally adjacent applications, the behavior model to describe user behavior associated with the wireless device; and apply the behavior model to predict a usage duration of a second application in response to usage of a first application.

21 Claims, 6 Drawing Sheets

Related U.S. Application Data continuation of application No. 14/669,964, filed on Mar. 26, 2015, now abandoned, which is a continuation of application No. 13/002,205, filed as application No. PCT/FI2009/050372 on May 8, 2009, now Pat. No. 9,075,883.

(51) Int. Cl.
*G06F 16/26* (2019.01)
*G06F 16/9535* (2019.01)
*G06Q 10/06* (2023.01)
*G06Q 10/0637* (2023.01)
*H04L 41/147* (2022.01)

(52) U.S. Cl.
CPC ......... *G06F 16/9535* (2019.01); *G06Q 10/06* (2013.01); *G06Q 10/0637* (2013.01)

(56) References Cited

U.S. PATENT DOCUMENTS

| | | |
|---|---|---|
| 4,973,952 A | 11/1990 | Malec |
| 4,990,892 A | 2/1991 | Guest |
| 5,014,206 A | 5/1991 | Scribner |
| 5,119,104 A | 6/1992 | Heller |
| 5,214,687 A | 5/1993 | Kaensaekoski |
| 5,233,642 A | 8/1993 | Renton |
| 5,241,534 A | 8/1993 | Omuro |
| 5,255,309 A | 10/1993 | Katz |
| 5,287,266 A | 2/1994 | Malec |
| 5,319,638 A | 6/1994 | Lin |
| 5,345,392 A | 9/1994 | Mito |
| 5,444,745 A | 8/1995 | Ali-Vehmas |
| 5,483,468 A | 1/1996 | Chen |
| 5,497,373 A | 3/1996 | Hulen |
| 5,521,907 A | 5/1996 | Ennis, Jr. |
| 5,580,254 A | 12/1996 | Ramsey |
| 5,603,095 A | 2/1997 | Uola |
| 5,642,353 A | 6/1997 | Roy, III |
| 5,675,510 A | 10/1997 | Coffey |
| 5,692,215 A | 11/1997 | Kutzik |
| 5,796,952 A | 8/1998 | Davis |
| 5,799,154 A | 8/1998 | Kuriyan |
| 5,848,396 A | 12/1998 | Gerace |
| 5,859,838 A | 1/1999 | Soliman |
| 5,872,588 A | 2/1999 | Aras |
| 5,922,044 A | 7/1999 | Banthia |
| 5,974,237 A | 10/1999 | Shurmer |
| 5,978,657 A | 11/1999 | Suzuki |
| 5,987,306 A | 11/1999 | Nilsen |
| 5,991,735 A | 11/1999 | Gerace |
| 5,991,806 A | 11/1999 | McHann, Jr. |
| 5,999,908 A | 12/1999 | Abelow |
| 6,088,588 A | 7/2000 | Osborne |
| 6,091,956 A | 7/2000 | Hollenberg |
| 6,108,637 A | 8/2000 | Blumenau |
| 6,115,680 A | 9/2000 | Coffee |
| 6,134,532 A | 10/2000 | Lazarus |
| 6,138,147 A | 10/2000 | Weaver |
| 6,144,944 A | 11/2000 | Kurtzman, II |
| 6,226,272 B1 | 5/2001 | Okano |
| 6,301,471 B1 | 10/2001 | Dahm |
| 6,353,929 B1 | 3/2002 | Houston |
| 6,397,256 B1 | 5/2002 | Chan |
| 6,405,245 B1 | 6/2002 | Burson |
| 6,405,251 B1 | 6/2002 | Bullard |
| 6,442,748 B1 | 8/2002 | Bowman-Amuah |
| 6,470,079 B1 | 10/2002 | Benson |
| 6,470,386 B1 | 10/2002 | Combar |
| 6,477,580 B1 | 11/2002 | Bowman-Amuah |
| 6,480,497 B1 | 11/2002 | Flammer, III |
| 6,516,189 B1 | 2/2003 | Frangione |
| 6,526,413 B2 | 2/2003 | Schwitters |
| 6,581,025 B2 | 6/2003 | Lehman |
| 6,587,835 B1 | 7/2003 | Treyz |
| 6,606,605 B1 | 8/2003 | Kolls |
| 6,647,269 B2 | 11/2003 | Hendrey |
| 6,697,944 B1 | 2/2004 | Jones |
| 6,745,011 B1 | 6/2004 | Hendrickson |
| 6,754,470 B2 | 6/2004 | Hendrickson |
| 6,757,543 B2 | 6/2004 | Moran |
| 6,763,458 B1 | 7/2004 | Watanabe |
| 6,792,457 B1 | 9/2004 | Zhang |
| 6,807,515 B2 | 10/2004 | Vogel |
| 6,816,886 B2 | 11/2004 | Elvanoglu |
| 6,834,308 B1 | 12/2004 | Ikezoye |
| 6,837,436 B2 | 1/2005 | Swartz |
| 6,840,861 B2 | 1/2005 | Jordan |
| 6,857,024 B1 | 2/2005 | Chen |
| 6,879,960 B2 | 4/2005 | Nascenzi |
| 6,883,168 B1 | 4/2005 | James |
| 6,912,507 B1 | 6/2005 | Phillips |
| 6,920,550 B2 | 7/2005 | Giuseppe |
| 6,928,280 B1 | 8/2005 | Xanthos |
| 6,968,178 B2 | 11/2005 | Pradhan |
| 6,970,131 B2 | 11/2005 | Percy |
| 6,973,491 B1 | 12/2005 | Staveley |
| 6,977,997 B2 | 12/2005 | Shioda |
| 6,980,149 B1 | 12/2005 | Meyer |
| 6,999,715 B2 | 2/2006 | Hayter |
| 7,010,107 B1 | 3/2006 | Yong |
| 7,013,136 B2 | 3/2006 | Frangione |
| 7,013,478 B1 | 3/2006 | Hendricks |
| 7,072,640 B2 | 7/2006 | Bernhart |
| 7,093,243 B2 | 8/2006 | Bailey |
| 7,127,261 B2 | 10/2006 | Van Erlach |
| 7,149,549 B1 | 12/2006 | Ortiz |
| 7,155,210 B2 | 12/2006 | Benson |
| 7,167,703 B2 | 1/2007 | Graham |
| 7,171,157 B2 | 1/2007 | Lee |
| 7,181,519 B2 | 2/2007 | Pillai |
| 7,188,355 B1 | 3/2007 | Prokopenko |
| 7,194,758 B1 | 3/2007 | Waki |
| 7,206,647 B2 | 4/2007 | Kumar |
| 7,209,473 B1 | 4/2007 | Mohaban |
| 7,227,498 B2 | 6/2007 | Soliman |
| 7,319,847 B2 | 1/2008 | Xanthos |
| 7,320,070 B2 | 1/2008 | Baum |
| 7,356,590 B2 | 4/2008 | Wilson |
| 7,392,310 B2 | 6/2008 | Motoyama |
| 7,426,717 B1 | 9/2008 | Schang |
| 7,441,246 B2 | 10/2008 | Auerbach |
| 7,474,645 B2 | 1/2009 | Lundin |
| 7,478,099 B1 | 1/2009 | Gandhi |
| 7,479,899 B2 | 1/2009 | Horstemeyer |
| 7,504,966 B2 | 3/2009 | Horstemeyer |
| 7,523,191 B1 | 4/2009 | Thomas |
| 7,548,915 B2 | 6/2009 | Ramer |
| 7,551,922 B2 | 6/2009 | Roskowski |
| 7,555,571 B1 | 6/2009 | Skinner |
| 7,561,069 B2 | 7/2009 | Horstemeyer |
| 7,562,367 B1 | 7/2009 | Arad |
| 7,587,732 B2 | 9/2009 | Wright |
| 7,609,650 B2 | 10/2009 | Roskowski |
| 7,623,823 B2 | 11/2009 | Zito |
| 7,627,872 B2 | 12/2009 | Hebeler |
| 7,630,867 B2 | 12/2009 | Behrens |
| 7,680,802 B2 | 3/2010 | Kato |
| 7,689,521 B2 | 3/2010 | Nodelman |
| 7,693,817 B2 | 4/2010 | Dumais |
| 7,733,799 B2 | 6/2010 | Kalliola |
| 7,742,762 B1 | 6/2010 | Biere |
| 7,751,385 B2 | 7/2010 | Monk |
| 7,756,829 B2 | 7/2010 | Bhanote |
| 7,769,633 B2 | 8/2010 | Jokinen |
| 7,861,225 B2 | 12/2010 | Lee |
| 7,899,915 B2 | 3/2011 | Reisman |
| 7,949,677 B2 | 5/2011 | Croft |
| 7,954,150 B2 | 5/2011 | Croft |
| 8,010,679 B2 | 8/2011 | Low |
| 8,014,726 B1 | 9/2011 | Petersen |
| 8,051,180 B2 | 11/2011 | Mazzaferri |
| 8,073,565 B2 | 12/2011 | Johnson |
| 8,161,172 B2 | 4/2012 | Reisman |

(56) References Cited

U.S. PATENT DOCUMENTS

| | | |
|---|---|---|
| 8,185,351 B2 | 5/2012 | Crystal |
| 8,214,429 B2 | 7/2012 | Chidel |
| 8,260,252 B2 | 9/2012 | Agarwal |
| 8,285,218 B2 | 10/2012 | Papakostas |
| 8,306,844 B2 | 11/2012 | Anderson |
| 8,321,556 B1 | 11/2012 | Chatterjee |
| 8,340,685 B2 | 12/2012 | Cochran |
| 8,363,650 B2 | 1/2013 | Rao |
| 8,489,669 B2 | 7/2013 | Johnson |
| 8,538,343 B2 | 9/2013 | Petersen |
| 8,549,133 B2 | 10/2013 | Vaver |
| 8,812,012 B2 | 8/2014 | Besehanic |
| 8,954,090 B2 | 2/2015 | Cochran |
| 9,008,586 B2 | 4/2015 | Petersen |
| 9,075,883 B2 | 7/2015 | Verkasalo |
| 9,148,458 B2 | 9/2015 | Verkasalo |
| 9,203,642 B2 | 12/2015 | Chatterjee |
| 2001/0028301 A1 | 10/2001 | Geiger |
| 2001/0047291 A1 | 11/2001 | Garahi |
| 2002/0002504 A1 | 1/2002 | Engel |
| 2002/0025795 A1 | 2/2002 | Sharon |
| 2002/0046090 A1 | 4/2002 | Stewart |
| 2002/0069037 A1 | 6/2002 | Hendrickson |
| 2002/0072966 A1 | 6/2002 | Eldering |
| 2002/0104083 A1 | 8/2002 | Hendricks |
| 2002/0112048 A1 | 8/2002 | Gruyer |
| 2002/0116124 A1 | 8/2002 | Garin |
| 2002/0116460 A1 | 8/2002 | Treister |
| 2002/0147980 A1 | 10/2002 | Satoda |
| 2002/0160758 A1 | 10/2002 | Pradhan |
| 2002/0186818 A1 | 12/2002 | Arnaud |
| 2002/0191762 A1 | 12/2002 | Benson |
| 2003/0033196 A1 | 2/2003 | Tomlin |
| 2003/0054757 A1 | 3/2003 | Kolessar |
| 2003/0063222 A1 | 4/2003 | Creed |
| 2003/0115586 A1 | 6/2003 | Lejouan |
| 2003/0149743 A1 | 8/2003 | Baluja |
| 2003/0177488 A1 | 9/2003 | Smith |
| 2003/0182567 A1 | 9/2003 | Barton |
| 2004/0088246 A1 | 5/2004 | Jepsen |
| 2004/0122939 A1 | 6/2004 | Perkins |
| 2004/0133672 A1 | 7/2004 | Bhattacharya |
| 2004/0181604 A1 | 9/2004 | Immonen |
| 2004/0243587 A1 | 12/2004 | Nuyens |
| 2004/0260470 A1 | 12/2004 | Rast |
| 2004/0267694 A1 | 12/2004 | Sakai |
| 2005/0136903 A1 | 6/2005 | Kashima |
| 2005/0138529 A1 | 6/2005 | Thorell |
| 2005/0144632 A1 | 6/2005 | Mears |
| 2005/0155019 A1 | 7/2005 | Levine |
| 2005/0210035 A1 | 9/2005 | Kester |
| 2005/0216509 A1 | 9/2005 | Kolessar |
| 2005/0216844 A1 | 9/2005 | Error |
| 2006/0004627 A1 | 1/2006 | Baluja |
| 2006/0019723 A1 | 1/2006 | Vorenkamp |
| 2006/0098027 A1 | 5/2006 | Rice |
| 2006/0120451 A1 | 6/2006 | Hannuksela |
| 2006/0129972 A1 | 6/2006 | Tyburski |
| 2006/0156209 A1 | 7/2006 | Matsuura |
| 2006/0184625 A1 | 8/2006 | Nordvik |
| 2006/0199988 A1 | 9/2006 | Kowalik |
| 2006/0211459 A1 | 9/2006 | Kubo |
| 2006/0217116 A1 | 9/2006 | Cassett |
| 2006/0218533 A1 | 9/2006 | Koduru |
| 2006/0270401 A1 | 11/2006 | Frangione |
| 2006/0294225 A1 | 12/2006 | Grecco |
| 2007/0011040 A1 | 1/2007 | Wright |
| 2007/0038516 A1 | 2/2007 | Apple |
| 2007/0060114 A1 | 3/2007 | Ramer |
| 2007/0061393 A1 | 3/2007 | Moore |
| 2007/0073717 A1 | 3/2007 | Ramer |
| 2007/0083611 A1 | 4/2007 | Farago |
| 2007/0094363 A1 | 4/2007 | Yruski |
| 2007/0100653 A1 | 5/2007 | Ramer |
| 2007/0112739 A1 | 5/2007 | Burns |
| 2007/0140451 A1 | 6/2007 | Altberg |
| 2007/0150599 A1 | 6/2007 | Neogi |
| 2007/0160185 A1 | 7/2007 | Taylor |
| 2007/0216642 A1 | 9/2007 | Kneissler |
| 2007/0260475 A1 | 11/2007 | Bhanote |
| 2007/0288277 A1 | 12/2007 | Neuhauser |
| 2007/0288476 A1 | 12/2007 | Flanagan, III |
| 2007/0294057 A1 | 12/2007 | Crystal |
| 2007/0294132 A1 | 12/2007 | Zhang |
| 2007/0294705 A1 | 12/2007 | Gopalakrishnan |
| 2007/0294706 A1 | 12/2007 | Neuhauser |
| 2008/0002677 A1 | 1/2008 | Bugenhagen |
| 2008/0005736 A1 | 1/2008 | Apacible |
| 2008/0076506 A1 | 3/2008 | Nguyen |
| 2008/0101552 A1 | 5/2008 | Khan |
| 2008/0109295 A1 | 5/2008 | McConochie |
| 2008/0109391 A1 | 5/2008 | Chan |
| 2008/0109888 A1 | 5/2008 | Ullah |
| 2008/0126420 A1 | 5/2008 | Wright |
| 2008/0140479 A1 | 6/2008 | Mello |
| 2008/0189411 A1 | 8/2008 | Motoyama |
| 2008/0214148 A1 | 9/2008 | Ramer |
| 2008/0222057 A1 | 9/2008 | Chen et al. |
| 2008/0243590 A1 | 10/2008 | Rich |
| 2008/0243822 A1 | 10/2008 | Campbell |
| 2008/0313033 A1 | 12/2008 | Guo |
| 2009/0013048 A1 | 1/2009 | Partaker |
| 2009/0013051 A1 | 1/2009 | Renschler |
| 2009/0013091 A1 | 1/2009 | Zhang |
| 2009/0019182 A1 | 1/2009 | Riise |
| 2009/0055523 A1 | 2/2009 | Song |
| 2009/0064248 A1 | 3/2009 | Kwan |
| 2009/0104915 A1 | 4/2009 | Katis |
| 2009/0132559 A1 | 5/2009 | Chamberlain |
| 2009/0138447 A1 | 5/2009 | Kalavade |
| 2009/0138593 A1 | 5/2009 | Kalavade |
| 2009/0150217 A1 | 6/2009 | Luff |
| 2009/0157512 A1 | 6/2009 | King |
| 2009/0172773 A1 | 7/2009 | Moore |
| 2009/0177507 A1 | 7/2009 | Breitgand |
| 2009/0187463 A1 | 7/2009 | Dacosta |
| 2009/0187939 A1 | 7/2009 | Lajoie |
| 2009/0222329 A1 | 9/2009 | Ramer |
| 2009/0240586 A1 | 9/2009 | Ramer |
| 2009/0262919 A1 | 10/2009 | Schoenberg |
| 2009/0287683 A1 | 11/2009 | Bennett |
| 2009/0299817 A1 | 12/2009 | Fok |
| 2009/0307263 A1 | 12/2009 | Skibiski |
| 2009/0319329 A1 | 12/2009 | Aggarwal |
| 2010/0004997 A1 | 1/2010 | Mehta |
| 2010/0030785 A1 | 2/2010 | Wilson |
| 2010/0079336 A1 | 4/2010 | Skibiski |
| 2010/0082301 A1 | 4/2010 | Skibiski |
| 2010/0100419 A1 | 4/2010 | Natoli |
| 2010/0100618 A1 | 4/2010 | Kuhlke |
| 2010/0100716 A1 | 4/2010 | Scott |
| 2010/0111370 A1 | 5/2010 | Black |
| 2010/0125491 A1 | 5/2010 | Elliott |
| 2010/0125657 A1 | 5/2010 | Dowling |
| 2010/0131443 A1 | 5/2010 | Agarwal |
| 2010/0151816 A1 | 6/2010 | Besehanic |
| 2010/0205220 A1 | 8/2010 | Hart |
| 2010/0205301 A1 | 8/2010 | Ansari |
| 2010/0217648 A1 | 8/2010 | Agarwal |
| 2010/0279665 A1 | 11/2010 | Hardin |
| 2010/0293221 A1 | 11/2010 | Sidman |
| 2010/0324861 A1 | 12/2010 | Goulding |
| 2011/0016137 A1 | 1/2011 | Goroshevsky |
| 2011/0035284 A1 | 2/2011 | Moshfeghi |
| 2011/0053513 A1 | 3/2011 | Papakostas |
| 2011/0087975 A1 | 4/2011 | Karsten |
| 2011/0264663 A1 | 10/2011 | Verkasalo |
| 2011/0314084 A1 | 12/2011 | Saretto |
| 2011/0321035 A1 | 12/2011 | Petersen |
| 2012/0052871 A1 | 3/2012 | Cochran |
| 2012/0121043 A1 | 5/2012 | Wambacq |
| 2013/0094399 A1 | 4/2013 | Chatterjee |
| 2013/0103764 A1 | 4/2013 | Verkasalo |
| 2013/0110634 A1 | 5/2013 | Cochran |

(56) References Cited

U.S. PATENT DOCUMENTS

| | | | |
|---|---|---|---|
| 2014/0019203 A1 | 1/2014 | Petersen | |
| 2014/0237595 A1 | 8/2014 | Sridhara | |
| 2014/0358640 A1 | 12/2014 | Besehanic | |
| 2015/0127427 A1 | 5/2015 | Cochran | |
| 2015/0200815 A1 | 7/2015 | Verkasalo | |
| 2016/0004971 A1 | 1/2016 | Verkasalo | |
| 2022/0038901 A1* | 2/2022 | Ito | H04W 12/08 |
| 2022/0046416 A1* | 2/2022 | Suzuki | H04W 12/06 |

FOREIGN PATENT DOCUMENTS

| | | |
|---|---|---|
| CN | 101124578 A | 2/2008 |
| CN | 101223786 A | 7/2008 |
| CN | 101425935 A | 5/2009 |
| EP | 0849909 A2 | 6/1998 |
| EP | 2204766 A1 | 7/2010 |
| JP | H11259422 A | 9/1999 |
| JP | 2000222314 A | 8/2000 |
| JP | 2001056805 A | 2/2001 |
| JP | 2001103086 A | 4/2001 |
| JP | 2005148289 A | 6/2005 |
| JP | 2006012144 A | 1/2006 |
| JP | 2007249306 A | 9/2007 |
| JP | 2009245019 A | 10/2009 |
| JP | 2009251743 A | 10/2009 |
| KR | 20080066676 A | 7/2008 |
| WO | 9826541 A1 | 6/1998 |
| WO | 9843455 A2 | 10/1998 |
| WO | 0079449 A2 | 12/2000 |
| WO | 0154034 A1 | 7/2001 |
| WO | 0217612 A2 | 2/2002 |
| WO | 0219625 A2 | 3/2002 |
| WO | 02073885 A1 | 9/2002 |
| WO | 02098029 A1 | 12/2002 |
| WO | 03021463 A1 | 3/2003 |
| WO | 2006040740 A1 | 4/2006 |
| WO | 2006098414 A1 | 9/2006 |
| WO | 2008118119 A1 | 10/2008 |
| WO | 2009091606 A1 | 7/2009 |
| WO | 2009094397 A2 | 7/2009 |
| WO | 2010019925 A1 | 2/2010 |

OTHER PUBLICATIONS

European Patent Office, "Exam Report," issued in connection with European Patent Application No. 01968369.7, dated May 9, 2008, 4 pages.
State Intellectual Property Office of P.R.C., "Notification of the Second Office Action," issued in connection with Chinese Patent Application No. 200980160175.6, Dec. 27, 2013, 7 pages.
The State Intellectual Property Office of People's Republic of China, "First Office Action," issued in connection with Chinese Patent Application No. 200980160175.6, dated Feb. 20, 2013, 7 Pages.
Australian Government, IP Australia,"Patent Examination Report No. 1," issued in connection with AU Application No. 2009345651, issued on Jul. 24, 2014, 5 pages.
Australian Government, IP Australia,"Patent Examination Report No. 2," issued in connection with AU Application No. 2009345651, issued on Sep. 18, 2015, 5 pages.
Australian Government, IP Australia,"Notice of Grant," issued in connection with AU Application No. 2009345651, issued on Aug. 25, 2016, 1 page.
Australian Government, IP Australia,"Notice of Acceptance," issued in connection with AU Application No. 2009345651, issued on May 2, 2016, 2 pages.
Canadian Intellectual Property Office, "Office Action", issued in connection with Canadian Patent Application No. 2,761,391, dated Sep. 13, 2017, 5 pages.
Patent Cooperation Treaty, "International Preliminary Report on Patentability," issued in connection with International Patent Application No. PCT/FI2009/050372, dated Nov. 17, 2011, 9 Pages.

United States Patent and Trademark Office, "Non-Final Action" issued in U.S. Appl. No. 16/352,144 on Dec. 8, 2021 (16 pages).
United States Patent and Trademark Office, "Final Action" issued in U.S. Appl. No. 16/352,144 on Jul. 9, 2021 (10 pages).
United States Patent and Trademark Office, "Non-Final Office Action," issued in connection with U.S. Appl. No. 14/852,255, dated Dec. 18, 2015, 7 pages.
The State Intellectual Property Office of the People's Republic of China, "Decision of Rejection," issued in connection with Chinese Patent Application No. 2009801601756, issued on Mar. 30, 2015 (6 pages).
United States Patent and Trademark Office, "Non-Final Office Action," issued in connection with U.S. Appl. No. 09/944,843, dated Aug. 23, 2003, 10 pages.
Claritas, "Prizm NE Methodology Summary," Claritas, Inc., 2004, retrieved from <http://www.tetrad.com/pub/prices/PRIZMNE_Methodology.pdf>, retrieved on May 3, 2011, 7 pages.
United States Patent and Trademark Office, "Notice of Allowance," issued in connection with.U.S. Appl. No. 09/654,486, dated Feb. 3, 2004, 5 pages.
Australian Intellectual Property Office, "Patent Examination Report No. 2," issued in connection with Australian Patent Application No. 2010355789, dated Mar. 9, 2016, 2 pages.
United States Patent and Trademark Office, "Non-Final Office Action," issued in connection with U.S. Appl. No. 13/685,689, dated Apr. 2, 2015, 37 pages.
United States Patent and Trademark Office, "Final Office Action," issued in connection with U.S. Appl. No. 14/852,255, dated Mar. 18, 2016, 12 pages.
United States Patent and Trademark Office, "Non-Final Office Action," issued in connection with U.S. Appl. No. 12/868,420, dated Dec. 9, 2011, 16 pages.
United States Patent and Trademark Office, "Notice of Allowance," issued in connection with U.S. Appl. No. 13/806,820, dated May 12, 2015, 15 pages.
United States Patent and Trademark Office, "Restriction Requirement," issued in connection with U.S. Appl. No. 11/825,933, dated Sep. 2, 2010, 6 pages.
European Patent Office, "Exam Report," issued in connection with European Patent Application No. 01968369.7, dated Mar. 28, 2012, 4 pages.
Korean Patent Office, "Notice of Provisional Rejection", issued in connection with Korean Patent Application No. 10-2011-7027828, dated Jun. 18, 2015, 16 pages.
State Intellectual Property of China, "Second Office Action," issued in connection with Chinese Application No. 201080068453.8, dated Jan. 6, 2016, 6 pages.
United States Patent and Trademark Office, "Notice of Allowance" issued in U.S. Appl. No. 16/352,144 on Jun. 28, 2022 (7 pages).
European Patent Office, "Summons to attend oral proceedings pursuant to Rule 115(1) EPC," issued in connection with European Patent Application No. 09844309.6, issued on Dec. 8, 2016, 7 pages.
Patent Cooperation Treaty, "International Search Report," issued in connection with PCT Application No. PCT/US2008/056282, dated Aug. 21, 2008, 5 pages.
United States Patent and Trademark Office, "Non-Final Office Action," issued in connection with U.S. Appl. No. 13/806,820, dated Jan. 15, 2015, 23 pages.
Byfield et al., "The Digital Revolution: Will it Lead to the Ultimate Demise of Newspapers?" Worldwide Readership Research Symposium, Session 10.3, 1999, pp. 547-556.
State Intellectual Property Office of P.R.C., "Notification of the First Office Action," issued in connection with Chinese Patent Application No. 200910145321.X, Nov. 16, 2011, 5 pages.
United States Patent and Trademark Office, "Non-final Office Action," issued in connection with U.S. Appl. No. 13/002,205, dated Mar. 27, 2014, 29 pages.
Korean Intellectual Property Office, "Notification of Provisional Rejection," issued in connection with Korean Patent Application No. 10-2011-7027828, dated May 31, 2016, 8 pages.

(56) References Cited

OTHER PUBLICATIONS

European Patent Office, "Exam Report," issued in connection with European Patent Application No. 01968369.7, dated Oct. 16, 2006, 5 pages.
Australian Intellectual Property Office, "Patent Examination Report #1," issued in connection with Australian Patent Application No. 2002332740, dated Apr. 23, 2007, 2 pages.
United States Patent and Trademark Office, "Final Office Action," issued in connection with U.S. Appl. No. 12/336,338, dated Nov. 18, 2011, 26 pages.
Korean Intellectual Property Office, "Notice of Provisional Rejection," issued in connection with Korean Patent Application No. 10-2011-7027828, dated Feb. 22, 2017, 10 pages.
Sheila Byfield, "Global Media change: A Comsumer Insight Perspective," Extract from the New Medium of Television, 2004, 6 pages.
Patent Cooperation Treaty, "International Preliminary Examination Report," issued in connection with International Patent Application No. PCT/US01/27235, Jan. 25, 2004, 4 pages.
State Intellectual Property Office of China, "Decision of Reexamination," issued in connection with Chinese Patent Application No. 200980160175.6, dated Dec. 1, 2016, 9 pages.
United States Patent and Trademark Office, "Final Office Action," issued in connection with U.S. Appl. No. 13/002,205, dated Jun. 20, 2013, 24 pages.
United States Patent and Trademark Office, "Non-Final Office Action", issued in connection with U.S. Appl. No. 14/669,964, filed Mar. 10, 2017, 17 pages.
United States Patent and Trademark Office, "Non-final Office Action," issued in connection with U.S. Appl. No. 14/669,964, dated Dec. 31, 2018, 16 pages.
Verkasalo, H. et al.: "A Handset-Based Platform for Measuring mobile Service Usage". INFO, The Journal of Policy, Regulation and Strategy, vol. 9, No. 1, 2007, pp. 80-96 [online], [retrieved on Feb. 5, 2009], Retrieved from the Internet; <http://www.emeraldinsight.com/Insight/viewContentItem.do?contentid=1589303&contentType=Article>, figure 1; 3rd and 4th paragraphs of section 1; sections 2, 4, 5.2, 17 pages.
Canadian Intellectual Property Office, "Examiner's Report," issued in connection with Canadian Patent Application No. 2,420,238, dated Mar. 24, 2009, 4 pages.
United States Patent and Trademark Office, "Notice of Allowance," issued in connection with U.S. Appl. No. 14/852,255, dated May 18, 2016, 31 pages.
Battelle Transportation Division, "Lexington Area Travel Data Collection Test," Global Positing Systems for Personal Travel Surveys, Sep. 15, 1997, Federal Highway Administration, 92 pages.
State Intellectual Property Office of P.R.C., "First Office Action," issued in connection with Chinese Patent Application No. 01816436.6, dated Dec. 9, 2005, 4 pages.
State Intellectual Property Office of P.R.C., "Notification of the First Office Action," issued in connection with Chinese Patent Application No. 200980160175.6, Feb. 20, 2013, 17 pages.
Canadian Intellectual Property Office, "Office Action," issued in connection with Canadian Patent Application No. 2,420,238, dated Aug. 23, 2010, 2 pages.
United States Patent and Trademark Office, "Notice of Allowance," issued in connection with U.S. Appl. No. 11/825,933, dated Jan. 19, 2012, 8 pages.
Ko, "Automatic Call Generation and Analysis-Network Testing and Cellularsurvey Tools," Making Life Easier—Network Design and Management Tools (Digest No. 1996/217), Oct. 10, 1996, Abstract Only, 1 page.
United States Patent and Trademark Office, "Non-Final Office Action," issued in connection with U.S. Appl. No. 13/616,714, dated Apr. 16, 2013, 10 pages.
United States Patent and Trademark Office, "Final Office Action," issued in connection with U.S. Appl. No. 13/616,714, filed Sep. 3, 2013, 14 pages.

Australian Intellectual Property Office, "Notice of Acceptance," issued in connection with Australian Patent Application No. 2010355789, dated Apr. 29, 2016, 2 pages.
Link et al., "Life360: Use of Mobile Technology for Electronic Ethnographic Studies," Mobile Research Conference, The Nielsen Company, Feb. 16-17, 2009, 29 pages.
United States Patent and Trademark Office, "Non-Final Office Action," issued in connection with U.S. Appl. No. 12/550,752, filed Feb. 22, 2012, 17 pages.
United States Patent and Trademark Office, "Non-Final Office Action," issued in connection with U.S. Appl. No. 11/825,933, dated Nov. 15, 2010, 31 pages.
Intellectual Property Office of Singapore, "Invitation to Response to Written Opinion," issued in connection with Singapore Patent Application No. 201108171-8, Jul. 10, 2013, 9 pages.
United States Patent and Trademark Office, "Notice of Allowance," issued in connection with U.S. Appl. No. 13/616,714, filed Nov. 14, 2013, 10 pages.
United States Patent and Trademark Office, "Notice of Allowance," issued in connection with U.S. Appl. No. 13/002,205, dated Oct. 8, 2013, 18 pages.
United States Patent and Trademark Office, "Notice of Allowance," issued in connection with U.S. Appl. No. 13/685,689, dated Aug. 18, 2015, 23 pages.
United States Patent and Trademark Office, "Non-final Office Action," issued in connection with U.S. Appl. No. 14/669,964, dated Dec. 13, 2017, 23 pages.
United States Patent and Trademark Office, "Notice of Allowance," issued in connection with U.S. Appl. No. 12/868,420, dated Aug. 27, 2012, 22 pages.
The State Intellectual Property Office of China, "Fourth Office Action," issued in connection with Chinese Patent Application No. 2009801601756, dated Feb. 21, 2017, 6 pages.
United States Patent and Trademark Office, "Final Office Action," issued in connection with U.S. Appl. No. 11/825,933, dated Jun. 23, 2011, 13 pages.
United States Patent and Trademark Office, "Final Office Action," issued in connection with U.S. Appl. No. 13/721,321 dated Nov. 1, 2013, 33 pages.
International Searching Authority, "International Search Report," issued in connection with International Patent Application No. PCT/FI2009/050372, dated Feb. 8, 2010, 4 pages.
Patent Cooperation Treaty, "Written Opinion," issued in connection with PCT Application No. PCT/US2008/056282, dated Aug. 21, 2008, 5 pages.
European Patent Office, "Extended European Search Report," issued in connection with European Patent Application No. 09015497.2, dated Apr. 8, 2010, 6 pages.
United States Patent and Trademark Office, "Notice of Allowance," issued in connection with U.S. Appl. No. 12/550,752, dated Jun. 8, 2012, 7 pages.
Hilbert et al., "An Approach to Large-Scale Collection of Application Usage Data Over the Internet," Software Engineering, 1998. Proceedings of the 1998 International Conference on Kyoto, Japan, Los Alamitos, CA, IEEE Comput. Soc, Apr. 19, 1998, 10 pages.
United States Patent and Trademark Office, "Final Office Action," issued in connection with U.S. Appl. No. 12/336,338, dated May 10, 2013, 130 pages.
Vucetic et al., "Network Management Applications for Wireless Local Loop," Electrotechnical Conference, May 1998, vol. 2 (pp. 787-791), 5 pages.
Claritas, "Prizm NE Segments," Claritas, Inc., retrieved from <http://www.tetrad.com/pub/documents/pnesegments.pdf>, retrieved on May 3, 2011, 3 pages.
United States Patent and Trademark Office, "Non-Final Office Action," issued in connection with U.S. Appl. No. 11/825,933, dated Mar. 22, 2012, 6 pages.
Patent Cooperation Treaty, "Written Opinion," issued in connection with PCT Application No. PCT/US2007/080235, dated Nov. 25, 2008, 6 pages.
United States Patent and Trademark Office, "Final Office Action," issued in connection with U.S. Appl. No. 14/669,964, dated Sep. 22, 2017, 11 pages.

(56) References Cited

OTHER PUBLICATIONS

European Patent Office, "Summons to attend oral proceedings pursuant to Rule 115(1) EPC," issued in connection with European Patent Application No. 01968369.7, dated Mar. 20, 2015, 7 pages.
United States Patent and Trademark Office, "Notice of Allowance," issued in connection with U.S. Appl. No. 13/721,321 dated Sep. 30, 2014, 12 pages.
Japanese Patent Office, "Notice of Reasons for Rejection," issued in connection with Japanese Patent Application No. 2013-515934, dated Feb. 10, 2014, 17 pages.
"Qualiquant Analytic Techniques," Lang Research, retrieved from http://www.langresearch.ca/qualiqua.html on Apr. 29, 2009, 2 pages.
United States Patent and Trademark Office, "Final Office Action," issued in connection with U.S. Appl. No. 14/669,964, dated Jun. 27, 2018, 23 pages.
Canadian Intellectual Property Office, "Examiner's Report", issued in connection with Canadian Patent Application No. 2,761,391, dated Nov. 2, 2015, 6 pages.
Gui, F. et al.: "Artificial Intelligence Approach of Context-Awareness Architecture for Mobile Computing". In: Proceedings of the Sixth international Conference on Intelligent Systems Design and Applications, pp. 527-533, Oct. 1, 2006, figure 1; sections 2, 3.A., 3.B., 4, 7 pages.
United States Patent and Trademark Office, "Non-Final Office Action," issued in connection with U.S. Appl. No. 14/591,205, dated Jan. 25, 2016, 34 pages.
United States Patent and Trademark Office, "Non-Final Action" issued in U.S. Appl. No. 16/352,144 on Jan. 7, 2021 (12 pages).
Japanese Patent Office, "Notice of Reasons for Rejection," issued in connection with Japanese Patent Application No. 2013-515934, dated Sep. 8, 2015, 10 pages.
State Intellectual Property Office of China, "Notification of the First Office Action," issued in connection with Chinese Application No. 201080068453.8, dated Mar. 20, 2015, 5 pages.
Canadian Intellectual Property Office, "Examiner's Report," issued in connection with Canadian Patent Application No. 2,761,391, dated Oct. 4, 2016, 5 pages.
European Patent Office, "Office Communication," issued in connection with European Patent Application Application No. 09015497.2, dated Feb. 17, 2011, 1 page.
European Patent Office, "Communication Pursuant to Article 94(3) EPC," issued in connection with European Patent Application No. 09844309.6, dated Jan. 13, 2016, 6 pages.
Australian Intellectual Property Office, "Patent Examination Report #2," issued in connection with Australian Patent Application No. 2011203048, dated May 30, 2014, 3 pages.
United States Patent and Trademark Office, "Final Office Action," issued in connection with U.S. Appl. No. 13/002,205, dated Oct. 25, 2012, 29 pages.
United States Patent and Trademark Office, "Notice of Allowance," issued in connection with U.S. Appl. No. 11/825,933, dated Jul. 30, 2012, 12 pages.
IP Australia, "Notice of Acceptance," issued in connection with Australian Patent Application No. 2008207615, Mar. 9, 2011, 3 pages.
Hilbert et al., "An Approach to Large-Scale Collection of Application Usage Data Over the Internet," IEEE, 1998, 10 pages.
Canadian Intellectual Property Office, "Notice of Allowance," issued in connection with Canadian Patent Application No. 2,420,238, Sep. 20, 2010, 1 page.
Wikipedia, "Mean Opinion Scores," retrieved from http://en.wikipedia.org/wiki/Mean-opnion-score, on Apr. 1, 2009, 3 pages.
Shen et al., "MobiVis: A Visualization System for Exploring Mobile Data," IEEE Pacific Visualisation Symposium, Mar. 5, 2008, pp. 175-182.
European Patent Office, "Exam Report," issued in connection with European Patent Application No. 01968369.7, dated Feb. 24, 2006, 3 pages.

Lettieri et al., "Advances in Wireless Terminals," IEEE Personal Communications, IEEE Communications Society, US, vol. 6, No. 1, Feb. 1, 1999, 14 pages.
Patent Cooperation Treaty, "International Search Report," issued in connection with PCT Application No. PCT/US2007/080235, dated Aug. 25, 2008, 4 pages.
Patent Cooperation Treaty, "International Preliminary Report on Patentability," issued in connection with PCT Application No. PCT/US2007/080235, dated Apr. 7, 2009, 7 pages.
United States Patent and Trademark Office, "Final Office Action," issued in connection with U.S. Appl. No. 13/002,205, dated Oct. 1, 2014, 18 pages.
European Patent Office, "Exam Report," issued in connection with European Patent Application No. 10012853.7, dated May 21, 2012, 3 pages.
European Patent Office, "Extended European Seach Report," issued in connection with European Patent Application No. 09844309.6, Jun. 11, 2013, 8 pages.
United States Patent and Trademark Office, "Non-Final Office Action," issued in connection with U.S. Appl. No. 12/336,338, dated Jun. 21, 2011, 31 pages.
Fahy, P et al.: "CASS—Middleware for Mobile Context-Aware applications". MobiSys 2004 Workshop on Context Awareness Hyatt Harborside, Boston, Massachusetts, USA, Jun. 6, 2004 [online], [retrieved on Feb. 5, 2009], Retrieved from the Internet: <http://www.sigmobile.org/mobisys/2004/context_awareness/papers/cass12f.pdf> sections 3, 4, 6 pages.
United States Patent and Trademark Office, "Final Office Action," issued in connection with U.S. Appl. No. 14/669,964, dated Jul. 10, 2019, 14 pages.
Canadian Intellectual Property Office, "Office Action," issued in connection with Canadian Patent Application No. 2,420,238, dated Feb. 8, 2010, 2 pages.
United States Patent and Trademark Office, "Notice of Allowance," issued in connection with U.S. Appl. No. 09/944,843, dated Mar. 8, 2004, 7 pages.
Reineke Reitsma, "Understanding and Harnessing Mobile Research," Forrester, Apr. 23, 2009, 33 pages.
"Gain a Holistic View of Consumers: Nielsen Life360-Ethnography in a digital context," The Nielsen Company, Apr. 23, 2009, 2 pages.
European Patent Office,"Communication pursuant to Article 94(3) EPC," issued in connection with European Patent Application No. 10012853.7, dated Mar. 16, 2015, 4 pages.
State Intellectual Property Office of P.R.C., "First Notification of Office Action," issued in connection with Chinese Patent Application No. 201010268716.1, Feb. 27, 2013, 14 pages.
Patent Cooperation Treaty, "Written Opinion," issued in connection with PCT Application No. PCT/FI2010/050548, dated Mar. 15, 2011, 6 pages.
State Intellectual Property Office of China, "Notification of Reexamination," issued in connection with Chinese Patent Application No. 2009801601756, dated Jun. 28, 2016, 7 pages.
Patent Cooperation Treaty, "International Search Report," issued in connection with International Patent Application No. PCT/US02/27631, dated Dec. 9, 2002, 1 page.
United States Patent and Trademark Office, "Notice of Allowance," issued in connection with U.S. Appl. No. 13/002,205, dated Mar. 6, 2015, 2015, 34 pages.
Korean Intellectual Property Office, "Final Rejection," issued in connection with Korean Patent Application No. 10-2011-7027828, dated Aug. 31, 2017, 7 pages. [English translation included].
Hungarian Patent Office on Behalf of the Intellectual Property Office of Singapore, "Examination Report," issued in connection with corresponding Singapore Patent Application No. 2011081718, dated May 29, 2014, 6 pages.
Woo et al., "Providing Internet services to mobile phones: a case study with email", The Ninth Ieee International Symposium on Personal, Indoor and Mobile Radio Communications, Boston, MA, USA, Sep. 8, 1998, New York, NY USA, IEEE, vol. 1, pp. 99-105, 7 pages. (Abstract provided).
Australian Intellectual Property Office, "Patent Examination Report No. 1," issued in connection with Australian Patent Application No. 2010355789, dated Jul. 22, 2014, 3 pages.

(56) References Cited

OTHER PUBLICATIONS

Patent Cooperation Treaty, "International Search Report," issued in connection with PCT Application No. PCT/FI2010/050548, dated Mar. 15, 2011, 4 pages.
United States Patent and Trademark Office, "Non-Final Office Action," issued in connection with U.S. Appl. No. 13/721,321, dated Apr. 1, 2013, 29 pages.
United States Patent and Trademark Office, "Notice of Allowance," issued in connection with U.S. Appl. No. 12/336,338 dated Apr. 7, 2014, 126 pages.
State Intellectual Property Office of China, "Notice of Allowance," issued in connection with Chinese Application No. 201080068453.8, dated Apr. 6, 2016, 2 pages.
IP Australia, "Patent Examination Report No. 1," issued in connection with Australian Patent Application No. 2011203048, dated Mar. 20, 2013, 5 pages.
Australian Intellectual Property Office, "Patent Examination Report No. 3," issued in connection with Australian Patent Application No. 2010355789, dated Apr. 12, 2016, 2 pages.
United States Patent and Trademark Office, "Non-Final Office Action," issued in connection with U.S. Appl. No. 09/654,486, dated May 27, 2003, 11 pages.
IP Australia, "Examiner's First Report," issued in connection with Australian Patent Application No. 2008207615, Jun. 3, 2010, 2 pages.
United States Patent and Trademark Office, "Notice of Panel Decision from Pre-Appeal Brief Review," issued in connection with U.S. Appl. No. 12/336,338, dated Apr. 6, 2012, 2 pages.
Patent Cooperation Treaty, "International Preliminary Report on Patentability," issued in connection with PCT Application No. PCT/FI2010/050548, dated Dec. 28, 2012, 7 pages.
United States Patent and Trademark Office, "Non-Final Office Action," issued in connection with U.S. Appl. No. 12/336,338, dated Sep. 24, 2012, 30 pages.
European Patent Office, "Extended European Search Report," issued in connection with European Patent Application No. 10012853.7, dated Mar. 17, 2011, 5 pages.
Guzdial et al., "Analyzing and Visualizing Log Files: A Computational Science of Usability," HCI Consortium Workshop, Feb. 2-6, 1994, 17 pages.
State Intellectual Property Office of P.R.C., "Second Office Action," issued in connection with Chinese Patent Application No. 201010268716.1, dated Jul. 29, 2013, 5 pages.
State Intellectual Property Office of China, "Third Notification of Office Action", issued in connection with Chinese Patent Application No. 2009801601756, dated Jul. 7, 2014, 11 pages. [English translation included].
European Patent Office, "Exam Report," issued in connection with European Patent Application No. 01968369.7, Mar. 9, 2011, 5 pages.
Australian Intellectual Property Office, "Patent Examination Report#!," issued in connection With Australian Patent Application No. 2013203793, dated May 16, 2014, 4 pages.
Patent Cooperation Treaty, "International Search Report," issued in connection with International Patent Application No. PCT/US01/27235, dated Jul. 18, 2002, 3 pages.
Jain et al. "Congestion Avoidance in Computer Networks With a Connectionless Network Layer," Digital Equipment Corporation, Copyright 1988, Version: Jun. 1, 1997, 21 pages.
Japanese Patent Office, "Notice of Reasons for Rejection," issued in connection with Japanese Patent Application No. 2013-515934, dated Nov. 4, 2014, 5 pages.
Korea Intellectual Property Office, "Notice of Rejection," issued in connection with Korean Patent Application No. 10-2013-7001922, dated Feb. 18, 2016, 4 pages.
United States Patent and Trademark Office, "Non-final Office Action," issued in connection with U.S. Appl. No. 13/002,205, dated Mar. 20, 2012, 32 pages.
United States Patent and Trademark Office, "Non-Final Office Action," issued in connection with U.S. Appl. No. 12/336,338 dated Nov. 27, 2013, 37 pages.
United States Patent and Trademark Office, "Non-Final Office Action," issued in connection with U.S. Appl. No. 14/462,190, dated Feb. 2, 2016, 17 pages.
Balakrishnan et al. "A Comparison of Mechanisms for Improving TCP Performance over Wireless Links," ACM SIGCOMM '96, Stanford, CA, Aug. 1996, 14 pages.
European Patent Office, "Communication Pursuant to Article 94(3) EPC," issued in connection with European Patent Application No. 09015497.2, dated Feb. 25, 2016, 7 pages.

* cited by examiner

SYSTEMS AND METHODS FOR BEHAVIOURAL AND CONTEXTUAL DATA ANALYTICS

CROSS-REFERENCE TO RELATED APPLICATIONS

This disclosure arises from a continuation of U.S. patent application Ser. No. 16/352,144 (now U.S. Pat. No. 11,502, 914), filed Mar. 13, 2019, which is a continuation of U.S. patent application Ser. No. 14/669,964, filed Mar. 26, 2015, which is a continuation of U.S. patent application Ser. No. 13/002,205 (now U.S. Pat. No. 9,075,883), filed Feb. 16, 2011, which claims priority to a national stage entry of International Patent Application No. PCT/FI2009/050372, filed May 8, 2009, each of which is hereby incorporated herein by reference in its entirety.

FIELD OF THE DISCLOSURE

The present disclosure generally relates to wireless devices and communications networks. In particular, the disclosure concerns centralized processing and interpretation of behavioural, contextual and optionally technical observations conducted by wireless devices.

BACKGROUND

Solutions for analyzing people's behaviour and usage habits via TV and radio terminals have already existed for some time and more recently, various solutions to measure online usage in the Internet have been introduced. The medium with which many people spend, however, increasing face time is actually a wireless device, such as a mobile phone. Newer phones, so-called smartphones, are increasingly capable of performing other tasks than mere communication functions. For example, it is possible surf on the web with these devices, consume multimedia content (such as music), play games, and access maps, not to talk about the variety of communication services available. In brief, lots of different kinds of usage, in a unique contextual and technical environment, takes place in smartphones, the global penetration of which is constantly increasing, and the importance as a medium being correspondingly elevated.

It therefore seems that in the light of rather dominant near-future trend, various smartphones might emerge as the sole digital devices that people really bother to carry with them on a daily basis. They will function as communication devices, authentication tools, watches, digital wallets and keys, etc. all alike. In this scenario, smartphones could also be exploited as always-on observers of life. Smartphone devices are possibly in the best position to become universal digital (life) observers, being able to track locations, temperatures, movements, communication activities, proximity to other people, social interactions, etc. There is no strict limit with regard to the possible observations as different kinds of observer entities and sensors may be embedded in or connected to the smartphones. Contextual environment is therefore particularly strong in the usage of smartphones. For example, in the future the smartphones might collect a rich feed of data containing comprehensive audio and video recordings relative to each day, and thus enable the users to generate a digital storage of their life lived. Even today's smartphone applications may be configured to track context, such as location and time, through publicly available application programming interfaces. Data that can be collected in a smartphone may naturally be used locally in the same device. For instance, obtained temperature data can be shown on the screen of the phone. However, some data could be, at least occasionally, worth sending to remote entities.

A number of prior art arrangements specifically propose exploiting information on the usage of data in wireless devices for providing personalized service in return.

For example, publication US2004181604 discloses a method for enhancing the relevance of content provided to communication devices, comprising: pushing content notifications relating to a plurality of topics to a communication device via a notification service; receiving content usage information from the communication device; modifying the topics targeted for the communication device based on the content usage information of the communication device; and pushing the content notifications related to the modified topics to the communication device via the notification service.

Although various prior art solutions mention collecting data from wireless devices, they do not really provide tangible means for proceeding with data analysis, exploration and exploitation. The solutions simply disclose collecting some predetermined data items from wireless devices or executing generic analytics regarding the usage of e.g. the Internet with simple statistical tools, for example. Moreover, the contemporary techniques highly rely on manual labour, are more or less use-case centric, typically monitor only a very limited number of events according to fixed and substantially memoryless schemes, and store and distribute the gathered data basically as is with narrow analytical scope.

SUMMARY

The present disclosure relates to alleviating at least some of the drawbacks of the prior art solutions and provide an intelligent, flexible, effective and adaptive centralized alternative for monitoring and analyzing the usage and context of wireless devices. In some examples, an automated data mining engine and related platform of the present disclosure that may be implemented as a server arrangement, e.g. software architecture therein. The devised server arrangement may be configured to execute processing and interpretation of behavioural, contextual, and preferably also technical observations provided by a plurality of wireless devices, operations of an automated data mining engine, and distribution of the derived information through application programming interfaces (APIs) towards external systems. The server arrangement may be applied in various kinds of analysis and/or control applications of both today and the future, which often have significant practical relevance.

Accordingly, in an aspect of the present disclosure, a server arrangement for managing observation data of wireless devices, such as smartphones, comprise: a data input logic for obtaining observation data from a number of wireless devices and optionally supplementary data from a number of other external data sources, the obtained data including behavioural, contextual, and optionally technical raw data relative to the wireless devices; a data mining logic for establishing a number of derived data elements, such as data tables or databases, on the basis of processing and analysing the obtained observation and optional supplementary data, said processing and analysing incorporating aggregation and optionally correlation, clustering, and/or factoring procedures, wherein at least one derived data element includes usage metrics with contextual and optionally technical dimension relative to one or more applications or other features of one or more wireless devices and users thereof, a data storage for storing the obtained data and the number of derived information elements, and a data distribution logic for providing derived data to one or more other entities.

In one example, the data distribution logic may, for example, push data to another entity or serve a data query constructed by the another entity through provision of derived information from one or more derived data elements according to the push logic settings or query parameters, respectively.

The contextual dimension may refer to contextual elements, e.g. time or location, in relation to which the behavioural usage data is established. Technical dimension may correspondingly refer to technical data.

Thus, various examples of the server arrangement of the present disclosure preferably exploit multi-dimensional, holistic data stream that may be input thereto substantially continuously from one or more wireless devices. This data stream may include behavioural (for example, start-up timestamp of a particular application session, and/or key press actions via the user interface of the device), technical (for example, bearer of a data session or signal strength during a voice call, data throughput, crash log), and/or contextual (for example, time data, current battery level or current location such as currently active cell of the network) data items. These different kinds of data items may be included in the same data transmission or a plurality of transmissions. Accordingly, the server arrangement is preferably configured to process the incoming behavioural, contextual and/or technical data (for example, to perform data filtering or clustering), enrich it (for example, to add metadata on application names and categorization), analyze it (for instance, execute recognition of behavioural and contextual patterns), build collective dynamic intelligence (for example to receive automatic admin alarms when a new application has been adopted by people, in other words significant behavioural deviations from the past take place) and/or provide derived information to external systems preferably through an application programming interface (API), which may implement a push functionality and/or be queried either on regular intervals or dynamically based on separate triggers. Further, the server arrangement preferably facilitates using (new) applications exploiting the derived information, such as behavioural and contextual advertising applications, and may be easily integrated with them. In addition to programmable intelligence, the server arrangement may incorporate machine learning and adaptive heuristics in understanding the changes in the patterns of wireless device usage, technical problems in data processing, missing data points, etc. that could affect the output of the whole analytics platform.

The input data may thus be initially remotely established by the instances of the applied observer logics running in the wireless devices, for which purpose also some commercially available solution may be applied instead of a proprietary one.

Typically one data entity on the level of observations (source data), such as a log row on application session start, which is input, refers to a data point of one or more data items (e.g. measured values), where the data point may relate to e.g. one action or event, but also other configurations are possible. For example, an activation of a device application, with time stamp and identification of the application (ID such as name and/or software identification code), may represent one data row (for instance, behavioural information), a triggered measurement of voice call signal-to-noise-ratio might form another row (for instance, technical information), and the change in the active cell tower of the network might induce a further row (for instance, contextual information). In the first example, the log row upon application session start contains one data point (session start), which may include e.g. two or more data items (name of the application, its application identification code, time stamp, and/or date stamp).

The data flow, or data feed, will be input to the server arrangement through a data input interface thereof. In addition to data input, the data input interface may preferably intelligently cultivate, match, and/or combine data, thus optimizing the use of the raw-level database. One example is the aforesaid enrichment of data items; e.g. the items relating to observed application usage sessions may be supplied with location information such as current cell tower identification code (observed earlier, for instance), which can be later used in matching usage statistics with geo-coordinates, for example. The utilized logic may be straight-forward and scalable, whereupon data processing in the data input interface is more contextual than behavioural. In other words, instead of immediately performing, upon data reception, advanced analytics or pattern recognition, the data input module combines, for example, data input log rows that are e.g. consequent to each other according to predetermined criterion, e.g. temporal distance of actions, and/or adds status information such as current cell tower indices (which are stored in status variables, being available all the time) thereto. For instance, in the aforementioned first example the data processing logic makes it possible to combine two consequent sessions of a calendar application together, if there was only a predetermined, e.g. one second, distance between separate sessions (most likely the user just closed a key lock application that automatically started in the user interface after first activating calendar, and this key lock application session was "removed" in filtering the incoming application logs, for example).

Data processing already in the input interface is beneficial as it can be typically done in real-time, reducing the further micro-level data processing load (from centralized databases). By doing certain actions, like combining consequent rows together (if they represent the same session, for instance), the reliability and value of the data can be increased. Further, the data input module may calculate immediate dynamic statistics out of the raw data. Dynamic statistics may provide valuable pieces of information for administrational purposes, possibly not utilizing historical or time series data at all (in contrast, in derived statistics almost everything may be based on aggregation, normalization and/or averaging, effectively processing many log rows in any particular process). Regarding dynamic statistics, for example, when incoming data is received from a certain user, a counter can be updated indicating that there is some new data from this particular user during a particular time period such as a day, and the time stamps for last data received can be updated for him. With these dynamic statistics it may be easier to follow how the system generally works, and what is the status of data collection.

Considering different examples of data storage in the server arrangement, raw data may be stored in a raw level data repository, which may form a part of larger data storage. The data is advantageously stored in relational database(s), and the raw data is frequently provided to a data mining engine for analysis and advanced processing. In addition to storing raw data, the data storage also stores the resulting derived information, i.e. data produced by a data mining module on the basis of conducted analysis. This derived information is preferably in a format that can be directly used by external systems. For example, a logical entity called a data warehouse may be used for storing the directly usable derived information comprising statistics like application usage activity figures for each user or a number of users, and such information can be used in producing aggregated figures such as calculating the penetration of mobile Internet browsers over different device platforms available in the market.

The data warehouse thereby advantageously stores the derived data elements and provides access thereto so that efficient execution of various data queries by the users of the server arrangement is facilitated and quickened further enabling conducting more complex queries and push-mode data provision to external entities. The external entities may include external logical entities physically still integrated with the server arrangement of the present disclosure, or also physically separate server entities, for example. For instance, queries and data provision on the basis of identifying those wireless device users who are currently abroad and/or have been using the calendar application of the device at least on a weekly basis during the past year, may be performed. Effectively, most data tables or other data entities of the overall data storage are something else than raw data items. Indeed, a number of derivative databases are desirable, and the raw data may be continuously and/or at discrete periods processed by the data mining engine, which then stores the resulting information in the derivative tables or other data elements of the warehouse. The derivative tables may thus incorporate e.g. daily statistics of application usage for each user, whereas in the raw data repository all the information may remain on a session level, unaggregated, for example. On the basis of a received query, derived data may be selected, processed and/or combined for output.

Accordingly, the data mining engine is either discretely or continuously mining the raw data repository and extracting useful information out of the raw data. Further, the data mining engine may mine and/or aggregate already-derived data entities, e.g. derivative data tables, or a combination of raw data and already-derived data entities, for obtaining additional derived data entities. The data mining engine preferably contains customized algorithms and procedures, which may be advantageously updated on the fly, being optimized, (fully) automated, and/or enabled to generate statistics, indicators, barometers, aggregated figures (for example summing up actions), averages (one form of aggregation) and/or other important derived data elements on the basis of the data arriving in the system from the wireless devices and optionally other elements. Further, the data mining engine may conduct factor and cluster analysis, perform correlation calculus, recognize patterns, learn, i.e. adapt its behaviour, from the incoming data, enrich the data and/or in other ways make more intelligence out of the often less meaningful raw data that is collected by the wireless devices, including behavioural, technical and/or contextual data.

A data distribution API may be logically built on top of the rest of the platform in order to efficiently facilitate practical applications and use cases of the platform in view of data provisioning The API is enabled to serve external clients that request data, i.e. the users of the service arrangement. The request types are standardized, typically including wireless device(s)/wireless device user(s) identification, time period, and/or identification of the needed statistics. In addition to or instead of the pull model of information delivery, the API may push information to one or more interfaces, if needed, by the defined trigger conditions. For example, interaction with a location-based mobile advertising platform may be implemented through the API by a location-based triggering logic.

As to the general utility of the various examples of the present disclosure, they enable conducting automated behavioural, technical, and contextual research including data collection and analytics for various different purposes ranging from targeted behavioural mobile advertising or traffic control (based on e.g. context such as location analysis of wireless device users, e.g. location tracking and/or prediction) to more cost-efficient and reliable ways of monitoring industry and device/application (type) usage trends. The conceived server arrangement is preferably designed so as to be easily functionally connectable to data input elements such as network-operable wireless devices and other entities via compatible data interfaces, which makes it particularly applicable in various kinds of situations wherein behavioural, technical and/or contextual information that is based on corresponding raw data as supplied by wireless devices may be utilized.

The server arrangement is enabled to autonomously process and analyze the raw data obtained from wireless devices, while understanding the nature and typical flow of data, and is optimized for handling of such transactional data with various special characteristics including the contextual nature thereof, the data initially being private and user-specific, thus facilitating the calculus of e.g. user-specific behavioural and/or contextual vectors with increased accuracy. As a result, the server arrangement is capable of managing the cumulative intelligence arising from the raw data and utilized data mining algorithms, serving as a clearing house for the data, making sense out of the data, and storing and processing the data in an optimal and technically scalable way, thereby providing a completely different approach for addressing the associated problem than the earlier solutions. Advantageously the server arrangement produces a variety of derived information, such as derived data tables and/or databases, so that upon receipt of a data query the related answer may be briefly provided either by providing the derived information as such or by rapidly turning it into a desired form first.

Secondly, examples disclosed herein may be designed so as to enable handling both intermittent and continuous data transmissions arriving from a plurality (e.g. tens, hundreds, thousands, or even more) of wireless devices substantially simultaneously. More specifically, data is first processed in a raw-level format after which it may be stored e.g. in a temporally organized database, on the basis of which data mining procedures, including e.g. aggregation, such as averaging or producing different frequency or count figures, are configured to calculate various kind of derivative data tables and/or summary statistics, for example, which are typically more useful to the users of the arrangement than raw data. The applied data analysis technology is preferably automatic in contrast to manual labor, being able to run both in a continuous manner (e.g. data input and pre-processing) and discretely (more advanced analysis), optimally leveraging the whole range of data arriving in the arrangement and keeping statistics up-to-date. The data mining engine and the overall arrangement are scalable by design and instead of including only of one module, there may be specific modules for different types of tasks. Due to the several layers of intelligence (data input, storage, and mining), modular structure, and the built-in data distribution API, the overall arrangement is easier to scale up than prior art solutions.

In some examples, the example disclosure suggests using behavioural metrics that are specific to wireless devices, which can be also completed with technical and contextual data. Behavioural metrics convey information, instead of mere data, thus providing more value to the applications of the whole platform. Especially, the behavioural metrics may include usage intensities for the applications and/or other features of the wireless devices, usage frequencies for the applications and/or other features of wireless devices, and/or locus of usage metrics (for example, contextual statistics) for the applications and/or features of wireless devices, and/or stickiness and adoption rates of the applications and/or features of wireless devices. The metrics may also be optimized when integrating the obtained information repository with practical applications, such as mobile advertising platforms, or network management platforms, such as network resource allocation systems. The enrichment, aggregation, e.g. averaging, procedures may be tailored in accordance with the nature of the transaction data available from wireless devices, and the data mining engine advantageously utilizes a number of add-on elements such as application directories (databases) and contextual databases, which may be required in the reliable calculation of the metrics. The data mining engine is preferably self-learning on the basis of behavioural heuristics. The engine also works across different wireless device platforms due to the preferably continuous learning/adaptation and/or standardized data input, instead of being just one more extremely generic or case-specific data mining tool.

Still further, different examples of the utilized database structure, i.e. data storage, may be optimally designed so as to enable data processing on multiple layers. For example, raw-level data may be aggregated independently of the higher level averaging and/or other aggregation procedures that utilize already calculated derivative elements such as behavioural metrics, for example.

Yet, various examples of the data mining engine may include, in addition to other applicable processing algorithms, a number of different statistical algorithms which are used to identify patterns and/or extract other potentially meaningful information out of data, for instance. These analysis algorithms may include, for example, a number of clustering algorithms for behavioural segmentation of subscribers, factor analysis approaches to categorize applications and content, and/or correlation analysis procedures to provide relevant information to pattern recognition engines.

Last, various examples of the data distribution layer of the present disclosure may provide a unique approach to modularize the use of the data extracted from wireless devices, and to integrate the data mining system with different practical applications. The defined API facilitates independent processing and analysis of data within the arrangement, and optimized provisioning of the data, either in a push or pull mode, to external systems and entities (which may still be physically integrated with the server). These external systems and entities might be, for example, mobile advertising platforms or network management platforms.

In another aspect, a method for cultivating observation data provided by a number of wireless devices, comprises
  obtaining and storing observation data from a number of wireless devices and optionally supplementary data from a number of other external data sources, the obtained data including behavioural, contextual, and optionally technical raw data relative to the wireless devices,
  establishing and storing a number of derived data elements on the basis of processing and analysing the obtained observation and optional supplementary data, said processing and analysing incorporating aggregating and optionally correlating, clustering, and/or factoring procedures, wherein at least one derived data element includes usage metrics with contextual and optionally technical dimension relative to one or more applications or other features of one or more wireless devices and users thereof, and
  providing derived data from one or more derived data elements to one or more other entities, such as serving a data query created by an external entity through provision of derived information from one or more derived data elements according to the query parameters.

In view of the terminology generally applied in this document, "behavioural data" is related to actual usage habits and behavior of the end-users of the wireless devices. Behavioural data may reflect the usage of applications, communication patterns, content consumption and/or interaction with the device user interface, for example. In this specific context the behavioural data supplied by the wireless devices is also rather specific to particular platforms (e.g. available smartphone device platforms, such as Google Android, RIM Blackberry, Windows Mobile, Symbian S60, Apple iPhone) and in that way incomparable to behavioural data acquired from other sources. Technical data from wireless devices may include, for example, measurements of cellular tower signal strengths, throughput rates in data sessions, and voice call signal-to-noise ratios. Technical data obtained from wireless devices may naturally complement or overlap with behavioural and/or contextual data. For instance, used wireless device platform may fit under both technical and contextual data. Contextual data provided by wireless devices may further include tags of location, time (i.e. temporal context), surrounding device IDs (e.g. Bluetooth and WiFi devices), and/or device status (e.g. back-light and battery status), for instance.

A "life feed" may refer to any information that may be generated in response to monitoring people's everyday life, including, for example, data on locations, movements, activities and calendar entries. In addition to various actions and events, a life feed can also incorporate user-generated content, such as blog entries and photos. A mobile life feed may be defined as a life feed that can be generated from data provided by a wireless device. As deliberated hereinbefore, contemporary wireless devices and their future examples can be considered as best all-around observers of life and thereby also the best automatic generators of life feed. The server arrangement of the present disclosure is capable of receiving data forming at least part of a life feed and analysing and/or processing it. The analysis results and/or processed data may be provided to third parties, such as mobile advertisers or network management entities, or back to the wireless device or other destination (e.g. social media service) determined by the user of the wireless device, for example.

An API is defined as application programming interface, being e.g. an interface provided by one software module to other modules, typically built for the function of distributing data. An API may support, for example, queries by other system in response to which it supplies data in accordance with the query details. APIs may also be used to define the communications and interoperability between modules of a single system.

A "(mobile) agent" is defined as a set of rules, e.g. at least one application, in a wireless device, capable of preferably seamless and automatic, i.e. non-intervening and non-disrupting other applications, execution on the background.

The agent is enabled to perform operations, and communicate with external entities, such as the Internet, or with other applications.

"Observers" are defined in this context as processes capable of generating data items, based on e.g. queries and use of the wireless device's operating system capabilities. Observers are functionally and sometimes also physically sensors, which may automatically sense, for example, changes identified in a cellular base station usage (when the device jumps from the coverage of one tower to the next, for instance). Observers may also refer to channels of user-generated content (for example, blog entries).

"Triggers" are rules and processes that trigger (induce) a certain action. In particular, they may define how the observations can be more effectively and automatically be done in wireless devices. Triggers can be based on time intervals, contextual changes and observations, external requests, or internal requests e.g. in a situation in which more data is needed for some other data points.

The concept of "intelligence" is used in this document in referring to a set of rules, algorithms, databases and/or processes that coordinate the overall procedure or individual micro-processes (for example, the triggering logic) of the associated entity. Intelligence is something that makes the related system to work smarter, in a more optimal way, saving energy and improving accuracy, for example. It may be based on fixed and/or self-learning, adaptive algorithms as well as on external input.

A "server" generally refers herein to a node or at least a logical aggregate of several nodes present in and accessible via one or more networks, for example the Internet. The server may serve clients, e.g. mobile agents running in wireless devices and other entities such as various network services. Clients may thus communicate with one or more centralized servers. Client-server architecture is a commonly used topology of building systems in the Internet.

The concept of "processing" is used in this document to refer to various kinds of actions that may be performed for data. These include data conversions, transformations, formulations, combinations, mash-ups enrichment, correlations, clustering, factoring, normalizing, and/or filtering, among others. Some forms of processing may be actively used in various examples of the present disclosure, including combinations and mash-ups (linking data points together and building relational data structures, for instance), conversions (generating, for example, meaningful streams of information entities from raw-level, unsorted data items, such as observed location points), enrichment (for instance, adding metadata and making the data richer than originally) and/or filtering (leaving out data that is not relevant or needed anymore, for example).

A "smartphone" is defined in this document as a wireless device capable of running an operating system facilitating installation of add-on applications and enabling a packet data connection to a target network such as the Internet.

"Viral advertising" or "geo-social recommendations" are in this document used with reference to advertisements or other pieces of corresponding information that users can send to other users, or which may be directly sent to (the wireless devices of) target people by the server arrangement of the present disclosure (or by a further entity obtaining data from the server arrangement) as tied to a certain context, location, and/or suggested automatically to users to be sent to other users by them, or bundled to other contextual pop-ups in an attractive way.

"Audience measurements" and "behavioural research" are used herein to describe the approaches in which usage habits and consumption behaviour of people are measured for the purpose of understanding patterns of usage for a particular platform, such as TV, radio, Internet, or wireless device platforms.

The expression "a plurality of" refers herein to any integer starting from two (2), e.g. two, three, or four.

The expression "a number of" refers herein to any integer starting from one (1), e.g. one, two, or three.

The expression "data transfer" may refer to transmitting data, receiving data, or both, depending on the role(s) of a particular entity under analysis relative a data transfer action, i.e. a role of a sender, role of a recipient, or both.

In one example and practical use case of the present disclosure, the server arrangement is configured to provide valuable data to network and/or wireless-device (local) services and/or applications that want to adapt to user behaviour and context. For example, the arrangement may be utilized for automatically informing the (local) wireless device of a user of the particular behavioural segment of the user, making it subsequently possible for the device to provide personalized use experience, for example, via highlighting useful applications in the menus of the device. For active multimedia users certain new multimedia features can be automatically suggested or highlighted in the user interface, for instance. The arrangement may provide adaptation data to external entities on the basis of internal triggers, e.g. a timer and/or a triggering logic, and/or in response to queries.

Another, either supplementary or alternative, example and practical use case of the disclosure relates to social media or other services deployed in computer networks, in which people nowadays spend a lot of time. By being able to analyze the contextual patterns with the help of the server arrangement of the present disclosure, e.g. the current location, and/or behavioural patterns, such as music consumption activity, the user interface of the service can be automatically customized to reflect such information available of the user, thus facilitating automated mass customization.

In a further, either supplementary or alternative, example and practical use case of the present disclosure, the present server arrangement may be utilized as an add-on feature in a social media service that provides end-users with a possibility to share content and interact with other people. The behavioural statistics, such as the average distance one travels every day, or number of (music) artists one listens to during a typical month, are useful statistics provided by the arrangement to the user of a wireless device in order to enrich and complement the typical content people share in those services.

Still in a further, either supplementary or alternative, example and practical use case of the present disclosure, mobile advertising is the selected target application. Preferably the advertising shall be highly targeted, timely, contextual, and/or behaviorally optimized to suit to a particular recipient of advertising. With the present disclosure, mobile advertising may be implemented with any of such requirements. In addition, due the nature of the disclosure, as being centralized and supporting data provisioning through a preferably scalable API, the suggested arrangement may be at least functionally integrated with external advertising systems.

In addition, explicit examples of methods to execute the abovementioned tasks in an automated fashion in the server arrangement are disclosed herein.

BRIEF DESCRIPTION OF THE DRAWINGS

In the following, the disclosure is described in more detail by reference to the attached drawings, wherein.

DETAILED DESCRIPTION

Figure 1:
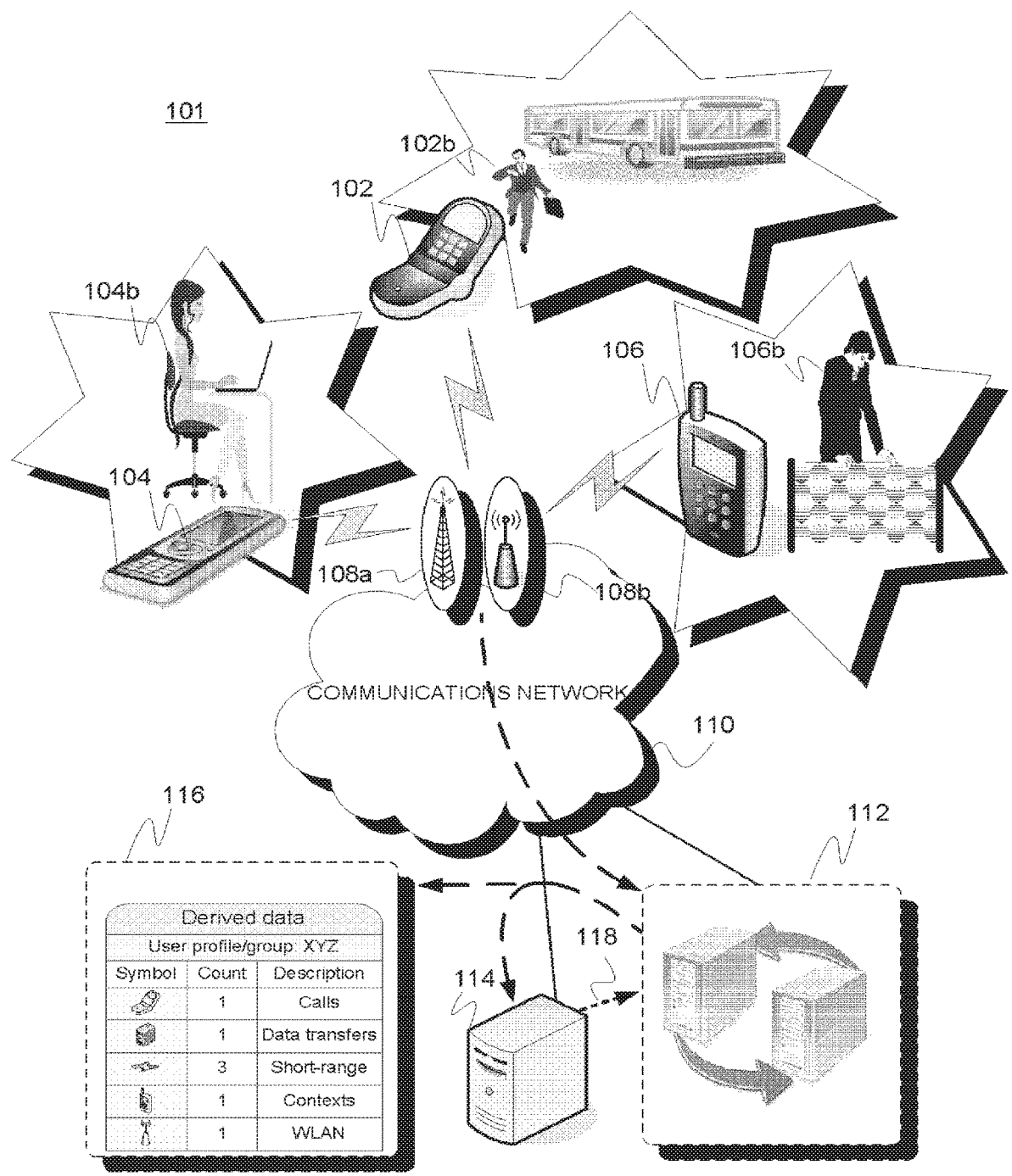
FIG. 1 illustrates the general concept of the present disclosure from a functional standpoint.

Reverting to the foregoing and with particular reference to FIG. 1, the overall architecture in connection with the present disclosure is illustrated first in a conceptual sense. The disclosed system is divided into two parts, namely a mobile (agent) part executed in one or more wireless devices 102, 104, 106 of users 102 *b*, 104 *b*, 106 *b*, respectively, and a server arrangement part 112 comprising one or more server devices functionally arranged so as to establish a server entity of the present disclosure. The users 102 *b*, 104 *b*, and 106 *b* are each living their life and using their (personal) wireless devices 102, 104, 106 in different environments and scenarios, which may be monitored via the wireless devices 102, 104, 106 by the applied, either commonly available or proprietary, solution for mobile data acquisition. The server arrangement 112 is typically connected to a communications network 110 whereto also the wireless devices 102, 104, 106 are provided with access e.g. via one or more access networks 108 *a*, 108 *b*, which may be cellular or wireless local area networks, for instance. External entities 114 such as services/servers may be connected to the server arrangement 112 via the network 110, for instance, for obtaining data from the server arrangement 112 and/or for providing supplementary data, note arrow 118, such as weather, location or other contextual information thereto. Rectangle 116 illustrates an example of data provided by the server arrangement 112 to one or more external entities 114 for use in different applications. The data is derived from the raw data, as supplied by the mobile agents of the wireless devices 102, 104, 106 and optional other entities, in the server arrangement 112 according to the principles described herein. The raw data may be subjected to different processing, factoring, aggregating, clustering, enrichment, filtering, etc. algorithms as a result of which the derived data is obtained. The derived data may represent figures relative to, e.g. one user or a group of users selected as desired, wherein the figures may include intensity frequencies or usage frequencies of associated actions or events (as shown at 116), for instance. The derived data may be visualized numerically/textually, e.g. via charts, and or graphically, e.g. via graphs.

Different examples of the present disclosure are thus partially enabled by the wireless devices 102, 104, and 106, which preferably automatically collect, via software and optionally hardware (e.g. sensors) sensing functionalities, a considerable amount of behavioural, technical and/or contextual data, i.e. observation data, and further automatically transmit at least part of the gathered data to one or more servers 112 at optimal time instants. Mobile agent software may be used for this purpose. The wireless devices 102, 104, 106, such as smartphones or communications-enabled PDAs (personal digital assistant), capable of providing data to the server arrangement 112 may especially comprise an observation logic for conducting observations relative to the wireless device and changes in the observation environment thereof, such as an occurrence of a certain event or action, and a data handling logic for storing, optionally pre-processing, analysing and/or aggregating observation data points of the gathered observation data to timed observation data transmissions via wireless transceiver towards the server 112. The observation logic may be arranged in each wireless device 102, 104, 106 to run on the background as intelligently triggered and mostly passively with minimum battery consumption and capacity usage, but still with comprehensive data acquisition capability relative to the relevant data points regarding the data associated with the device. The events may include, for example, substantially non-user-initiated incidents, such as battery status or location (e.g. cell tower or GPS-identified) change, not at least directly initiated by the user of the device. The actions may include substantially user-initiated intentional activities and incidents, for example use of the web browser, movements, reading a message, etc. Some incidents may be also considered to conveniently fit both of the above incident classes.

As a tangible example use case, upon recognizing that the active base station has changed an associated observation can be made so that the details of the base station with the desired parameters like signal strength and/or timing advance will be scanned. Accordingly, a related data point may be written into a data log. The observation logic may collect data points based on communication actions (for instance, initiating a call, answering a call, sending a message such as an SMS (Short Message Service), MMS (Multimedia Message Service), or e-mail message, receiving a corresponding message, etc.), sensor data (e.g. temperature, acceleration, position (orientation and/or location via e.g. GPS (Global Positioning System)/cell identification/triangulation), light intensity), application usage, microphone usage, loudspeaker/audio output such as music reproduction, camera usage, any user input or action in general, calendar entries (additions/deletions and/or actual realization/activation thereof), and in principle the observations can range from simple temperature-type logging to all-day audio and video recordings, for instance, which are automatically observed (recorded) in the device.

Preferably the wireless devices are configured to push the data towards the server at appropriate time instants. For example, related intelligence (logic) embedded in the device, may determine the optimal time to transmit the processed data from devices to server(s). Such intelligence may be implemented using contextual triggers (e.g. location changes), behavioural triggers (e.g. user's actions), time limits (e.g. regular transmission), emergency transmits (for instance, when fire observed in the proximity of the phone), cost-efficiency (transmitting after a certain threshold of data is collected to local memory, limiting the costs of transmission) and battery-optimization (saving as much of the battery as possible). The intelligence logic is preferably capable of learning from the collected data, observed patterns, and/or input from external entities such as servers, and adapt to contextual dimensions as well.

The wireless device according to any example of the present disclosure comprises at least one wireless communications transceiver. Non-limiting examples of the transceivers include a GSM (Global System for Mobile Communications) transceiver, a GPRS (General Packet Radio Service) transceiver, an EDGE (Enhanced Data rates for Global Evolution) transceiver, a UMTS (Universal Mobile Telecommunications System) transceiver, a WCDMA (wideband code division multiple access) transceiver, a PDC (Personal Digital Cellular) transceiver, a PHS (Personal Handy-phone System) transceiver, and a WLAN (Wireless LAN, wireless local area network) transceiver. The transceiver may be such that it is configured to co-operate with a predetermined communications network (infrastructure), such as the transceivers listed above. The network may further connect to other networks and provide versatile switching means for establishing circuit switched and/or packet switched connections between the two end points. In addition/alternatively the device may comprise a wireless transceiver such as a Bluetooth adapter meant for peer-to-peer communication and e.g. piconet/scatternet use. In addition, the terminal may comprise interface(s) for wired connections and associated communication relative to external entities, such as an USB (Universal Serial Bus) interface or a Firewire interface.

Figure 2:
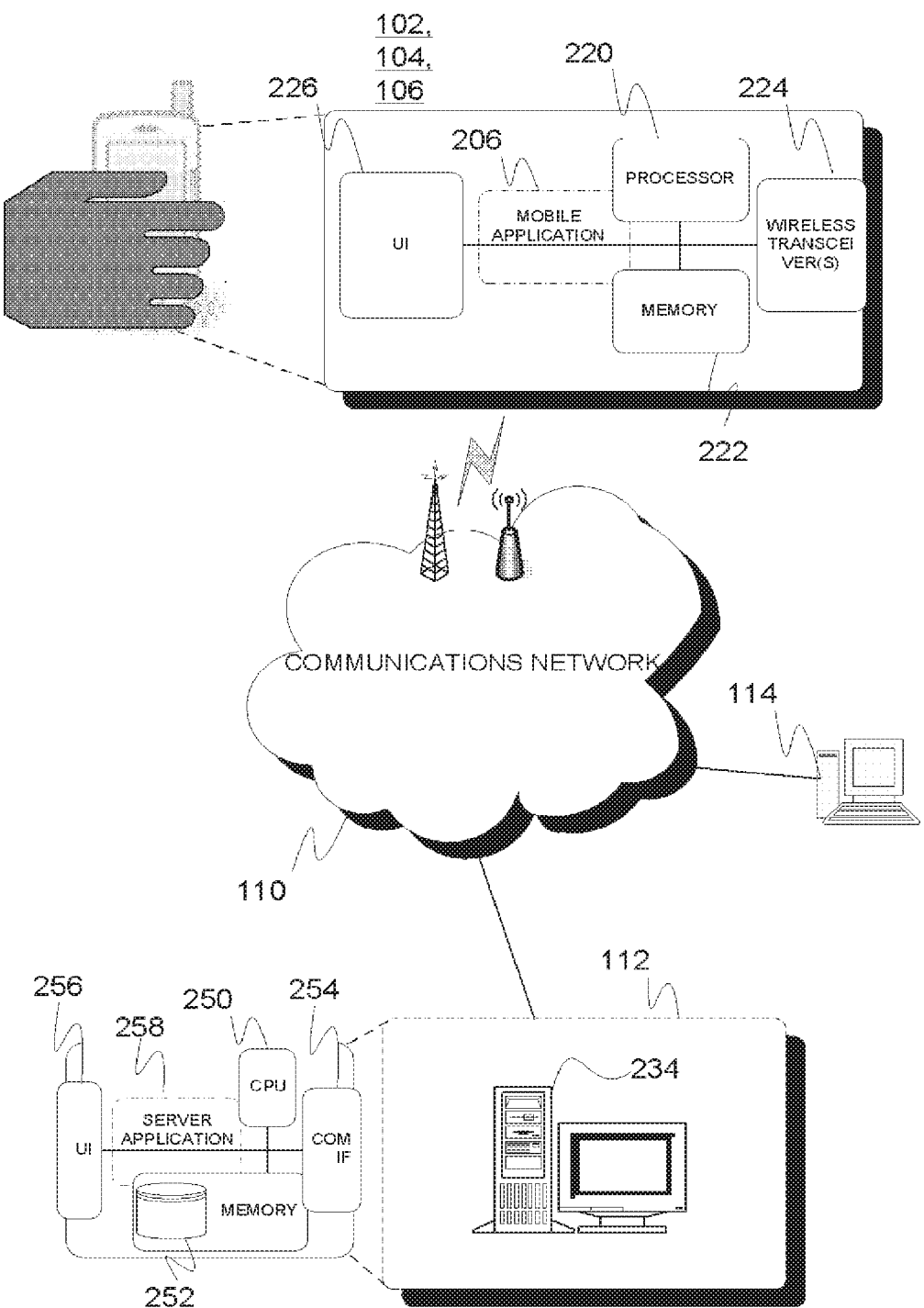
FIG. 2 illustrates different features of an example of the present disclosure via a more technical approach.

FIG. 2 illustrates various technical aspects of the present disclosure and related wireless devices in light of a certain feasible example. A data source of the server arrangement 112 such as a wireless device 102, 104, 106 is typically provided with one or more processing devices capable of processing instructions and other data, such as one or more microprocessors, micro-controllers, DSP's (digital signal processor), programmable logic chips, etc. The processing entity 220 may thus, as a functional entity, physically comprise a plurality of mutually co-operating processors and/or a number of sub-processors connected to a central processing unit, for instance. The processing entity 220 is configured to execute the code stored in a memory 222, which may refer to instructions and data relative to the mobile agent software architecture 206 for providing the server arrangement 112 with observation data. Software 206 may utilize a dedicated or a shared processor for executing the tasks thereof. Similarly, the memory entity 222 may be divided between one or more physical memory chips or other memory elements. The memory 222 may further refer to and include other storage media such as a preferably detachable memory card, a floppy disc, a CD-ROM, or a fixed storage medium such as a hard drive. The memory 222 may be non-volatile, e.g. ROM (Read Only Memory), and/or volatile, e.g. RAM (Random Access Memory), by nature.

The UI (user interface) 226 may comprise a display, and/or a connector to an external display or data projector, and keyboard/keypad or other applicable control input means (e.g. touch screen or voice control input, or separate keys/buttons/knobs/switches) configured to provide the user 102 b, 104 b, 106 b of the device 102, 104, 106 with practicable data visualization and device control means. The UI 226 may include one or more loudspeakers and associated circuitry such as D/A (digital-to-analogue) converter(s) for sound output, and a microphone with A/D converter for sound input. In addition, the device 102, 104, 106 comprises a communications interface such as a radio part 224 including a wireless transceiver for general communications with other devices and/or a network infrastructure and optional other wireless or wired data connectivity means such as one or more radio transceivers or wired interfaces (e.g. Firewire or USB (Universal Serial Bus)) for communication with other devices such as terminal devices, peripheral devices or network infrastructure(s). It is clear to a skilled person that the device 102, 104, 106 may comprise numerous additional functional and/or structural elements for providing advantageous communication, processing or other features, whereupon this disclosure is not to be construed as limiting the presence of the additional elements in any manner.

Correspondingly, the server arrangement 112 may comprise one or more computer devices 234 comprising a communications interface 254 such as a LAN (Local Area Network) adapter, e.g. Ethernet adapter, a processing entity such as at least one processor 250 for processing data, a memory 252 for storing data, server side software architecture 258 and UI 256. Different examples of the server arrangement internals are described in more detail hereinafter.

Software functionalities 206 and/or 258 may be implemented as one or several, mutually communicating, software applications executed by the processors 220 and 250, respectively. Either computer software (product) may be thus provided on a carrier medium such as a memory card, a memory stick, an optical disc (e.g. CD-ROM or DVD), or some other memory carrier. The instructions required for implementing the application(s) may be stored in the carrier medium as executable or in some other, e.g. compressed, format, such that the software may be transported via the carrier medium to a target device and installed therein, e.g. in the hard disk thereof, or executed directly from the carrier medium in the target device by loading the related instructions to the memory 222, 252 of the target device not until execution, for instance. Alternatively, software 206, 258 may be transmitted to a target device over the air via the wireless transceiver or a through a wired communications connection.

Figure 3:
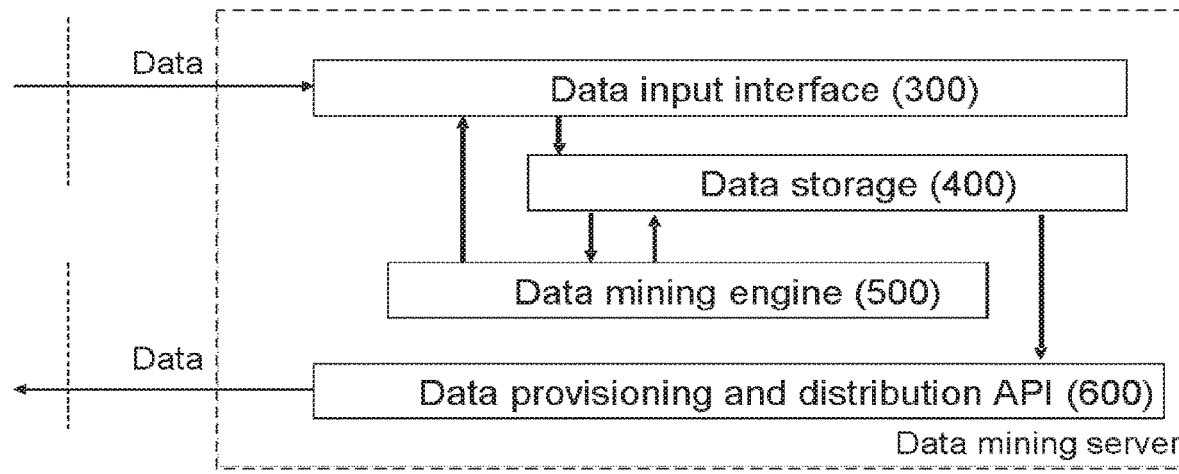
FIG. 3 is a combined block and flow diagram of one example in accordance with the server arrangement of the present disclosure.

FIG. 3 represents a combined block and flow diagram of one example of the server arrangement in accordance with the present disclosure. As explained hereinbefore, a mobile agent may observe events, actions and/or properties in each wireless device and optionally perform pre-processing for the observed data and generally manage the wireless device-based intelligence regarding data handling and transmission to the server arrangement operated by one or more at least functionally connected server apparatuses. On the server side, a data input interface 300 is responsible for receiving and preferably pre-processing behavioural, contextual and/or technical data collected by the wireless devices, and for storing data in one or more raw level databases by providing the data to a data storage module 400. The data input interface 300 may also receive instructions and/or updates regarding e.g. how to handle data, from a data mining engine 500, which is illustrated by an arrow between the engine 500 and the data input interface 300. Data storage 400 may handle both raw and derived data, i.e. it preferably stores all the raw data as processed by the data input interface 300 and additionally further manages the data processed and analyzed by the data mining engine 500, i.e. the derived data. The data storage 400 maintains a so-called data warehouse, which may basically store the relevant information including derived data to be later provided to external entities through a data provisioning and distribution API 600. The data storage 400 also contains other required data tables, for example mapping tables for applications, country codes (MCCs), and operator codes (MNCs), which may be updated dynamically. The data mining engine 500 may process the raw data provided by the data storage 400, and supply the processed data and analysis results, i.e. derived data, back to the storage 400 after each analysis round, for example.

Figure 4:
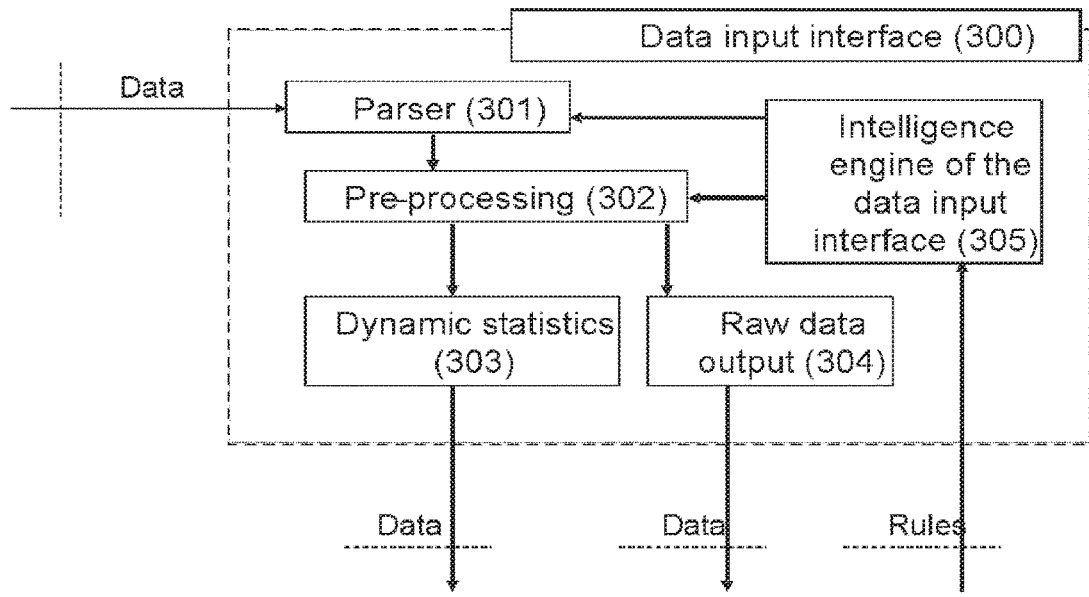
FIG. 4 is a combined block and flow diagram of one example of a data input interface applicable in the server arrangement.

In FIG. 4, a combined block and flow diagram of one example of a data input interface (module) 300 is depicted. The parser 301 receives data such as data logs from external systems, typically from the mobile agents installed in the wireless devices, or via intermediate or other systems such as data servers, and preferably reads different kinds of data log formats (for example, some of the data can be defined through the XML specification), while optionally also decompressing and/or decrypting data, when needed. Advantageously the parser 301 may further detect and leave out, i.e. filter out, corrupted data by monitoring e.g. data values (do they follow a predetermined range, for example). The data input interface 300 is guided by an intelligence engine 305 that maintains the knowledge regarding rules and processes by which the data input interface 300 operates, i.e. associated logic. The intelligence engine 305 may be controlled by a data mining engine as explained hereinafter and illustrated by the arrow "Rules". The parser 301 may assign unique user identification numbers for each set of incoming data, i.e. basic identifiers for the incoming data. This facilitates more efficient processing of data later in the system, as only such user identification codes need to be used in referring to a particular user's data points. A pre-processing component 302 may perform, preferably in a continuous manner, operations on the data that is fed to it by the parser 301. Pre-processing may, for example, include enrichment, such as addition of cell tower indices to incoming data points, and/or sorting of data points (if the data is not already received in a chronological order). A dynamic statistics module 303 may, substantially upon data arrival, derive and/or update simple and straightforward statistics out of the raw data flow, thus updating, for example, the status of each user stored in the system (for example, updating at the time of receiving a data point that such data is the most current for the respective user), thereby keeping track for example for how many people some data is received during the past, e.g. 12, hours. Dynamic statistics may typically be simple counters for administrational purposes, and no advanced aggregation or statistical calculus is needed (in contrast, derived data points may utilize historical data and aggregation procedures). Dynamic statistics may also be used as triggers for certain activities (like automated data exports by the data distribution module). A raw data output module 304 may handle the communication of raw data to a data repository of a data storage module to be reviewed next.

Figure 5:
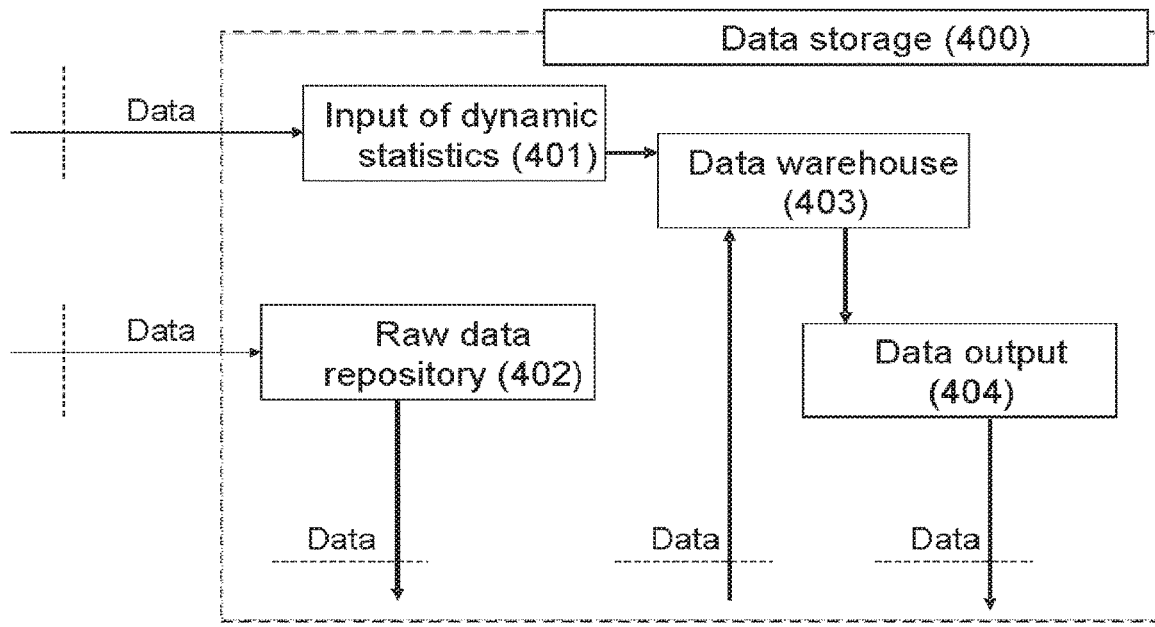
FIG. 5 is a combined block and flow diagram of one example of a data input interface applicable in the server arrangement.

In FIG. 5, a combined block and flow diagram of one example of data storage 400 is depicted. Input of dynamic statistics entity 401 receives the brief updates sent by the data input interface 300, such as status of individual users (or devices) providing data to the system. These data points may be practically immediately updated in a data warehouse entity 403, which at least logically maintains the higher level data instead of raw data. A different data stream, though preferably (pre-) processed by the data input interface 300, is received in a raw data repository 402. The raw data repository 402, may preferably store all raw data and index data efficiently by using e.g. masking identification numbers calculated over user identification numbers, being thus able to use physically separate databases in storing the vast amount of private data.

By using masking and utilizing optimal database architecture, private data if collected (such as email addresses and names) and research data (behavioural, technical, contextual data) can be separated. Only research data may be needed in analytics. Indexing, buffering, replication and/or other database configurations can be adjusted also for the requirements of the data mining engine and back-up purposes. Effectively the database design facilitates optimal use of memory capacity together with optimizing latency and other important factors in using the data. The raw data will be provided to a data mining engine upon request and received back as processed, i.e. derived, data and analysis results for storage in a data warehouse 403. The data warehouse 403 may therefore maintain cultivated information, i.e. data that has been processed to a form that can be utilized in practical applications right away, or to a form that is quicker to process further with desired algorithms, such as clustering, or statistical procedures, such as averaging or other type of aggregation. The data stored in the data warehouse 403 may be optionally provided to a data distribution and provisioning module through a separate module, data output 404, which may be configured to take care of the caching, buffering and/or scalability of data export actions. In many cases, the data warehouse 403 may be physically distributed across several server apparatuses.

Figure 6:
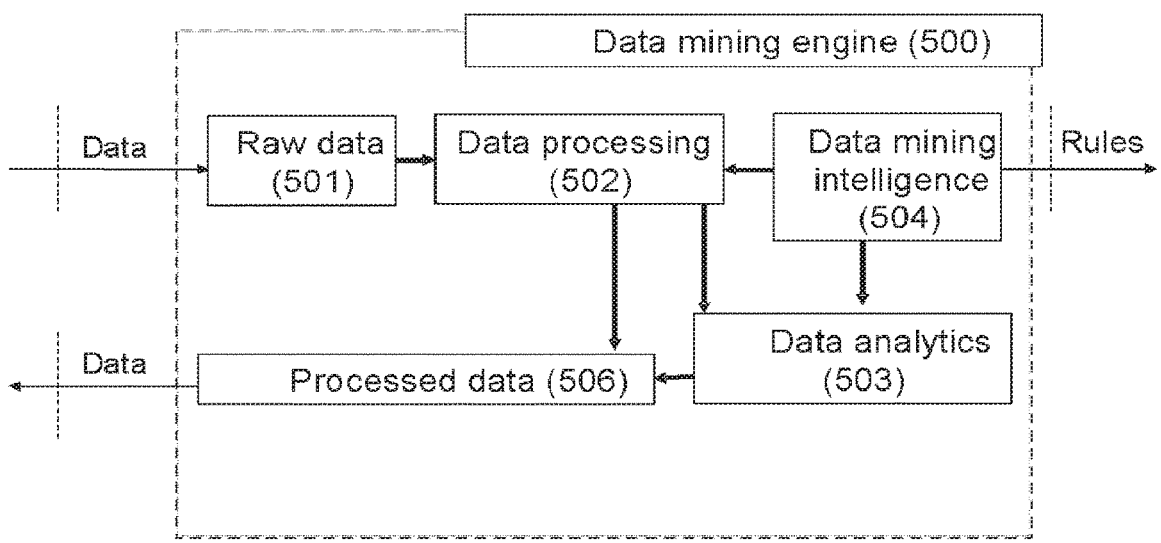
FIG. 6 is a combined block and flow diagram of one example of data storage applicable in the server arrangement.

In FIG. 6, a combined block and flow diagram of one example of a data mining engine 500 is depicted. Raw data may be first stored in a raw data module 501, e.g. in a set of databases, just to temporarily store the data arriving from the data warehouse for analysis. Accordingly, module 501 works as a buffer, loading data optimally to data processing functions. A data processing module 502 fulfils a number of specific processing and analysis needs in view of behavioural, contextual and/or technical data obtained from the wireless device platforms. For example, the processing of application session logs may be one rather concrete and in many cases complex process taken care of by the data processing module 502. Associated processing, which relates e.g. to the time-orientation of data (e.g. application of a certain process rule on a dataset of chronological order), or otherwise replication or adjustment of certain required pre-processing activities that are not yet done on the data, may be performed by the data processing module 502. A data analytics module 503 may, in contrast, perform operations such as averaging, other aggregation, correlation, clustering, factor analysis etc., which are not micro-level processes. The data mining intelligence engine (logic block) 504 may guide both data processing and data analytics, and additionally also the data input interface. As the intelligence engine 504 is preferably centrally located, it is easy to update so that changes may be adopted substantially immediately in the analysis procedures. The processed data is transmitted back to the data storage, and further to the data warehouse thereof, via a processed data module 506, for example. The data mining procedures can be run, for example, for all the data received yesterday, but they can also be run for larger patches of data (for example to process all the raw data in the raw data storage) if indicated in the parameters when it is launched. The data mining procedures may be automatically revoked to process and analyze for example the past three days' of data every night, to automatically keep analytics data updated.

Figure 7:
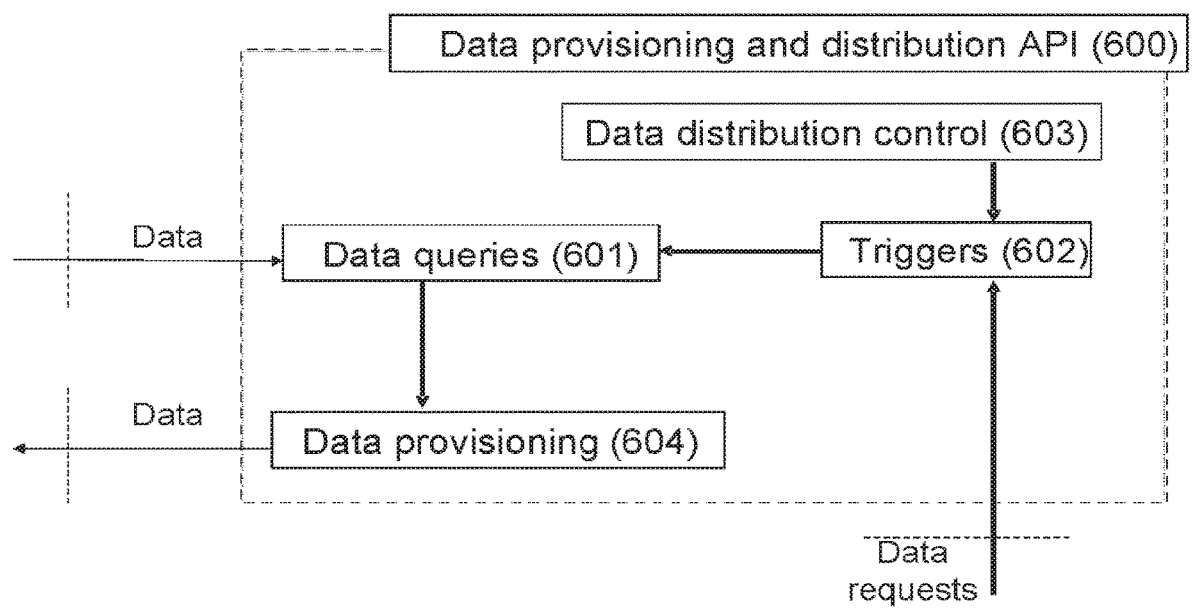
FIG. 7 is a combined block and flow diagram of one example of a data distribution API applicable in the server arrangement.

In FIG. 7, a combined block and flow diagram of one example of a data provisioning and distribution API 600 is presented. A data distribution control 603 may maintain the configuration of the module, meaning, for example, the rules on how to transmit and provide data, and optionally e.g. privacy settings, optionally including certificates, regarding the data handling relative to individual external systems. Triggers 602 may be configured to guide a data query module 601. The triggering logic follows the logic assigned by the control module 603, for instance, whereupon triggering of data queries is enacted either actively (data is polled from the database(s) actively), or by redirecting and coordinating external requests. The data query module 601 manages the interface with the data repository, directing the data to a data provisioning module 604, which maintains a variety of interfaces needed in view of data provision to external entities via their data interfaces, such as mobile advertising platforms.

Next, some examples of the applicable processing for the raw level data, which is stored in one or more raw-level databases, are explained. The data input interface is advantageously configured to operate smoothly and efficiently, being, for example, able to input data in a standardized format, such as XML (extensible Markup Language) format, from several wireless devices substantially simultaneously thanks to the distributed, independent structure of data input processes and associated buffering. The data input interface may read received data log rows of wireless devices one by one, for instance. To support the scalability and/or interoperability of the overall arrangement, the data input interface may be configured to recognize familiar application names and application identification numbers, for example, right in the parser. The parser may be responsible for real-time data input processing from external systems, understanding the form, structure and/or content of input data. If the application is known (the name or application ID number recognized and categorized), renaming (harmonization of application naming) and/or categorization may be performed already in the parser, before anything is stored into the database. Effectively, in this example, applications can be identified by name and/or by distinct application identification codes. Separate application mapping files may reside in the server memory, and they can be matched with incoming data and the presented identifiers (names and application IDs) to execute processing (renaming) and to add metadata (application categories).

The mapping files on the server can be preferably updated dynamically, either automatically (with interface(s) to external systems), or by hand.

The parser (and/or the pre-processing block) may also keep contextual information in the buffer when reading data, e.g. the user's location, and attach contextual metadata to observations that are ready consequently, being able, for example, to map the name of a previously launched application into the data, thereby identifying for example the differences between the execution (starting) times of applications (which can be used in calculating the duration of application sessions, for instance). The parser, which may advantageously analyze several data points, e.g. data rows, substantially at the same time in its memory, also enables to identify duplicate data or erroneous data feed items (that can be identified by monitoring several consequent rows). It may further perform contextual enrichment in real-time. The parser may further be made responsible for raw-level filtering and processing of data preferably done at the time of storing data into the raw data repository. These activities may include, for example, removal of certain types of data points. The rules of processing can be stored in the intelligence engine of the data input interface and be changed preferably dynamically.

Some tangible examples of data mining activities of the present disclosure are disclosed. In particular, it is explained how the application session logs can be processed so as to make data more reliable and meaningful. Application session logs are rather important piece of behavioural source data. One challenge is that there are many kinds of data points available. The data collection systems, e.g. the ones in the wireless devices, may log application process starts and stops, and separately application activations and minimizations on the user interface. In addition, all different wireless device platforms may have unique names and application identification codes for the same or similar applications. In addition, naming of applications also depends on, for example, the language of the device. By taking the example of application logs, the data processing engine of the disclosure is able to recognize, based on e.g. fingerprinting (sensing the incoming data and for example associated IP packet header information), the particular wireless device platform (for example Windows Mobile, Symbian S60, or Apple iPhone) that is supplying the data, to build meaningful data items out of raw data (for example with application start and stop items to build a new application session item including both the start time and duration), and to map all application occurrences with coherent, universal identification codes, handled in a centralized way by the platform, even in post-analysis. If new, still unidentified, names of application are observed, there can be a separate request initiated for developers (through email, for example) to map those applications into the existing database. The other choice in application processing is to perform all or some of these activities in the parser. The advantage of carrying out processing in the data processing module of the data mining engine (not when receiving the data) is the fact that if the information in the mapping tables, for example, is changed, or if more complex procedures (such as combining already calculated behavioural indices with transactional data to perform normalization) need to be done, then the data processing engine can be used to run even patches of already stored data and spend more time with the procedures. By definition, the parser may work only at the time of receiving data and is not initiated to process data that is already in the database. Because of the real-time requirements of the parser implementation, it may be much simpler as to its implementation than the data processing engine.

The data processing engine may be configured to compare, for example, execution initiation times of applications and/or to calculate the run times of applications. For some applications, like music players, process start and stop times should be used for the calculation of session durations, because music player is typically left on the background without any separate user interface level activity. For most other applications, for example calendar and document viewing applications, the nature of the application states that it is natural to measure duration from user interface level activation logs.

The data mining engine and especially e.g. data processing engine thereof may, for example, exclude screensaver, key lock and menu processes from the dataset, and then build more precise session-level variables, for example face time or reliable run times of applications, without letting system processes and other disturbing data points to bias results. In practice the systems utilizes black lists in certain procedures, which helps in streamlining and filtering, for example, application or Internet usage (URL) logs. The data processing engine may also able to monitor, for example, consequent SMS or other messages, to group received messages from a particular contact with an outgoing SMS or other message to the same contact, thus identifying chat-oriented sessions and/or reply messages. In addition, for example opening, reading and/or removal times of SMS or other messages can be mapped through heuristics to the time of receiving the message, facilitating multiple kinds of duration-oriented statistics. Yet, for example, receiving multiple e-mail or other messages during a certain time period can be mapped to a specific session of the messaging application, thereby making comparisons both on an application session level and micro-level messaging possible.

Third, some examples of the analytics procedures are elaborated relating to discrete aggregation procedures. In particular, it is explained what kind of insights can be derived by just aggregating, such as averaging, statistics provided by the processes described herein. One major focus of data aggregation may be in calculating intensity variables, such as activity measures measured by the corresponding usage time, e.g. minutes of usage, per selected time unit (e.g. hour, week, month, etc.), number of sessions per time unit, and/or number of events or actions per time unit. These variables may be calculated for each user, a plurality of users, for each application (for example, a calendar application), for each application category (for example, email applications), and/or a device feature (for example, USB connections) category, across contexts, through powerful aggregation procedures. In order to facilitate scalability, the recurring processes of the data analytics procedures may first calculate intensity variables on the level of individual actions, which can be used as source data for higher level averaging. The intensity variables may be stored in the data warehouse, e.g. one data row describing a user identification number, date, time, and/or details of the action/event (for example the name of an application, such as calendar or voice call, its identification number, categorization information like application classification group, and session-level details, like duration of a session or length of a text message). These more micro-level derived data entities may be processed frequently (for example, every night) and/or on a need basis. With a scalable aggregation engine, which may be run on the basis of parameters such as types of data points needed, user identification information, and range of dates, either regularly or through separate triggering logic, the existing data can be processed and transformed into new data entities such as tables, for example one presenting the number of calendar application activations for each user for each day. By aggregating the data even further, for example, this data table can be processed to identify the number of distinct users using calendar at a certain instant such as on a specific date, or alternatively, for each user an arithmetic mean number of calendar application launches can be calculated for the period under study. Because the micro-level data is in such a harmonized, though precise, form, multiple kinds of aggregation, such as averaging, methods can be used in a scalable fashion to derive meaningful statistics of usage behavior and contextual patterns. Some practical behavioural application-level individual statistics besides usage intensity figures, that can be derived from raw data, include for example usage frequencies of applications (during an average month, on how many distinct days the application is used, for example) and significance of application (out of a particular user's total time spent with the device, how much time goes on a particular application on average, for instance).

Fourth, some practical explanations regarding the possible structure of used databases is provided, explaining how the scalability can be supported therein. The data stored in the databases, in the raw-level format, is preferably, however not necessarily, in Unicode format, and various relations may be utilized in storing the data optimally. For example, a typical way to handle wireless device application information is to attach a unique application identification number for each of the application process execution start data rows, which are contained in the raw-level data storage. Separate databases may be established to contain metadata related to application identification codes, including for example name, application type, and application category information. Another example comes from the storage of contextual information. For example, for each date and hour, and for each user, a variable can be calculated identifying the country of presence, and possible some metadata such as whether that country is the user's home country or not. By simply matching raw-level data points with this separate table of context data, contextual information can be attached to raw level data points. Such derived data table may be used, for example, to aggregate the total application face time across application categories separately for different contexts such as home and roaming contexts. In the database architecture, the raw level sessions and activity logs, and most important mapping files, are preferably kept separate, or at least separable, from the derived data tables. Derived data (tables) may be calculated from raw-level data (tables), utilizing aggregation incorporating functions like averaging. For example, the derived data tables, in the context of mobile application usage, may include a data table containing average daily total face time, given e.g. in minutes, with the device in view of each user and each date, or a data table communicating the average number of distinct applications used by each user during a time period such as each calendar week.

Derived database entities such as data tables are typically calculated based on the raw data, being dynamic in the sense that more recent data may, in many occasions, be added to accompany (and added to the "end" of) older data, although sometimes the older data may be at least partially replaced, for example, if e.g. time dimension is not needed in the table. Derived data tables contain valuable higher-level information, instead of mere raw data, in the sense of conveying something meaningful, like behavioural statistics, required by external systems and practical applications. In addition, derived data entities such as data tables and some of their content may be output to visualization engines in a preferred, e.g. standardized, format to facilitate visualization and representation of information. Derived data tables represent behavioural key performance indicators (KPIs), for example average time spent with certain applications per unit of time (e.g. usage minutes per week), or average stickiness (e.g. relative proportion of application trial users continuing usage actively) or adoption rates (e.g. relative proportion of people interested in application(s) actually using them).

In the following, example implementation guidelines for factorization and clustering of subscribers and content are provided. Factorization of behavioural, technical, and/or contextual data means reducing the unnecessary degree of accuracy in the data, while also recognizing patterns across dimensions. For example, a variety of descriptive behavioural statistics can be calculated for every user, including, for example, a number of minutes or other time units a user on average spends with music applications every day or during some other time period, or the proportion of all outbound voice calls taking place abroad. By using factor analysis across a certain number of descriptive statistics, higher-level factors correlating with the original variables can be found, at the same time building higher level understanding of interrelationships and correlation between variables. A practical application is to analyze usage frequency variables of application categories (for example voice, instant messaging, email messaging, music, video, map, imaging, office etc.) and build factors on top of them, for example to derive a generic multimedia usage indices out of music, imaging and/or video application usage variables, completely automatically. In addition to applications, the presented factor analysis, being based on derived data tables, may be applied to different means of communication, type of consumer content (music), or e.g. the type of web sites browsed in the Internet, for instance.

From the perspective of segmentation, a plurality of users can be clustered to form behaviorally coherent groups, for instance. Behavioural segmentation, instead of static segmentation models such as the ones based on demographics or attitudinal (intentions and satisfaction of users) factors, is dynamic and potentially more meaningful approach from the perspective of many target applications including mobile advertising, for example. Behavioural (for example multimedia, data and/or communication service usage) segmentation can be also combined with contextual statistics (for example the amount of movements taking place on the weekends). As the initial stage of clustering, the nodes of the graph may represent e.g. users, and the weights between the nodes may be Pearson correlation coefficients (or equivalent), calculated, for instance, based on behavioural metrics (for example application usage times per week: browser, voice, messaging and map application usage minutes per week) provided by the used platform. In the examples here, the original data to describe edges between nodes may be multi-dimensional, i.e. multiple weights between nodes can be calculated.

In view of automatic clustering, an example of a modularity-based approach to analyze the graphs produced by the platform is described. The modularity may be defined as follows. Denote by $e_{ij}$ half of the fraction of edges in the graph that connect vertices from community i to community j, given that i≠j. Half of the fraction is chosen instead of the full fraction since the normalization demands that $e_{ij}+e_{ij}$ equals the total fraction. Denote also by $e_{ii}$ the fraction of edges inside community i.

Using this notation, the sum $$b_i = \Sigma_{i=1}^{N} e_{ii} \quad (1)$$

equals the fraction of edges that fall within the communities of all edges, while $$a_i = \Sigma_{j=1}^{N} e_{ij} \quad (2)$$

is the fraction of ends of edges that emanate from vertices in group i. Now, if all edges were connected at random, the fraction of them inside community i would be $a_i^2$. This lets one define the modularity Q as $$Q = \Sigma_{i=1}^{N}(e_{ii} - a_i^2) \quad (3)$$

If the edges are random, the modularity equals zero, whereas values Q>0 indicate a clustered structure. Usually values of about Q>0.3 or 0.4 may be considered as signs of significant clustering.

The used method of optimizing modularity works as follows. Let initially each vertex form an own community. Consider all possible aggregations of two communities into one, and compute the modularity after these joins. Choose the one with the highest modularity and aggregate the communities together. Repeat this procedure iteratively for the new set of communities until there is no pair of two clusters the joining of which would increase the modularity. The communities at this point are then the best division of the original graph into communities in terms of the algorithm.

Denote by $d_{ij}$ the measurement of node i in measurement group j. By dividing the values with the measurement group averaged ones $$\alpha_j = \frac{\sum_{k=1}^{N_p} d_{ij}}{N_p} \quad (4)$$

where $N_p$ is the number of nodes, the scaled measurements $\beta_{ij}$ can be defined as $$B_{ij} = \frac{d_{if}}{\alpha_j} \quad (5)$$

leading to the vectors $$\gamma_k = (B_{lg})_{(j=1)}^{N_a} \quad (6)$$

describing the patterns of individual node k. Here, $N_a$ is the number of measurement groups. Using these vectors, it is possible to define the similarity coefficients for nodes k and l as explained below.

Using these similarity coefficients, a fully connected weighted graph may be built with the edge between nodes k and l having the weight $w_{kl}$ determined, for example, by using Pearson correlation coefficient. The algorithm takes the weights of the edges into account. This may be done simply by redefining the factors $e_{ij}$ to $$e_{ij} = \frac{w_i f}{2 \sum_k \sum_{j>x} w_{xj}} \quad (7)$$

where the summation is over all pairs of vertices. E.g. Newman's algorithm may be applied to produce a division of the nodes into clusters.

Further, an example of a pattern recognition model to be used in connection with the present disclosure is explained, making a point on how to facilitate the arrangement's self-learning capabilities. In this example, users' application logs are studied, and in particular the jumps from one application to next are analyzed.

Users may switch from an application to another sometimes fully based on feelings or discrete use cases they want to do with the smartphone. However, in many cases usage sessions are tied together, for example after taking a picture with the camera, a wireless device user may want to send it to their friends through multimedia messaging. By feeding historical patterns of application usage, including information on the identity and/or type of applications, session durations, and/or the identity and type of temporally adjacent application(s), statistical models of usage behavior can be built, based on, for example, Markov models and/or neural networks. With the resulting probabilistic models, reasonable estimates can be calculated for each user's status at any particular time, for example predicting for how long he will still be using the same application, or what is the personal probability of initiating a certain session, e.g. a camera session, after the current activity. Similar estimates may be determined for an aggregate of several users. These kinds of pattern recognition and predictive models, based on behavioural and contextual models together with the data processing capabilities introduced into the examples of the present disclosure, have direct applications in sending predictive advertisements or other personalized data to users, or communicating likely movement patterns (number of people, direction, times, locations) of people to e.g. municipal authorities in advance of actual movements even taking place, for facilitating traffic control, for instance.

Next, few API implementation guidelines are elaborated, regarding the practical integrations to external entities such as different external systems including advertising and social media systems. The data distribution API is preferably based on virtualized and scalable clusters of databases and used with a semantic database model enabling various kinds of queries, from direct to more complex, semantically formulated ones. The data distribution API advantageously facilitates both pull and push model of data distribution. At least either model shall be anyhow supported. In addition, it centrally manages each user's data, based on universal privacy settings, user-specific settings, data sharing conditions, and/or other centralized data management settings the owner or administrator of the platform has defined. The data distribution API makes sure that the data is funneled efficiently to proper interfaces in a correct format. The data can be output in various formats. Widespread standards such as XML and GeoRSS (RSS, Really Simple Syndication) may be used in pre-defined data streams. In addition, a number of customized interfaces can be easily built between the API and e.g. widely used external services in the communication network by applying the available request formats of the API. Some example data request (query) types include:

1. Specific behavioural statistics (for example, average application, e.g. web browser usage, activity during a time period such as weekends)
2. Status information retrieval (location, context, and/or profile status of a user of a wireless device)
3. IDs of wireless device users currently in a certain context (location, application session)
4. IDs of wireless device users having used the web browser at least once during a certain time period
5. List and/or number of countries a specific wireless device user or a group of users have ever or during a predetermined period visited
6. The most typical location for a specific wireless device user at a certain instant, e.g. during Friday afternoons
7. Likelihood estimates (predictions) for a particular wireless device user's location in a desired time period, e.g. in one hour
8. The image content feed from a particular location during a certain time period
9. Most recent behavioural profile of a wireless device user based on application usage patterns, preferably updated frequently such as every night.

Some parameters that can be, either alone or as a desired combination, included as part of the queries include:
1. Wireless device user identification
2. Time indication (temporal context)
3. Location (context) (old, current, future)
4. Status information (e.g. "moving", "busy")
5. Context (semantic, for example home, school, office, bus)
6. Behavioural patterns (application usage)

The data distribution API facilitates external widgets or applications to execute queries in the database. For example, a specific application can be built for social media (networking) or other service, provided with its own user interface and functionalities that plots the data provided by the arrangement of the present disclosure through the data distribution API. The data distribution API does not have to take a standpoint on how the data is to be used. Rather, it specifies a multi-use interface to easily conduct queries in the intelligent and optimized database(s) of derived data.

The data distribution API is typically built on top of derived data elements such as data tables. Potentially the most widely used practical applications for the API layer include the interfaces towards mobile advertising platforms, to which updated contextual and behavioural profiles of users may be sent on regular intervals, for example every x, the x being e.g. sixty, minutes. Other examples include interfaces built towards social media services and other web services, which may utilize real time behavioural and contextual data in improving the service end-user experience, in building new features, in adjusting the user interfaces dynamically for each user, in tailoring content, and in enriching customer data bases with more dynamic, instead of static data. The purpose of the data distribution API is to leverage the processed and derived behavioural and contextual statistics, which may be updated dynamically based on incoming data streams, and to distribute information to those systems and interfaces in a scalable and flexible manner, thereby maximizing the value of the arrangement.

Figure 8:
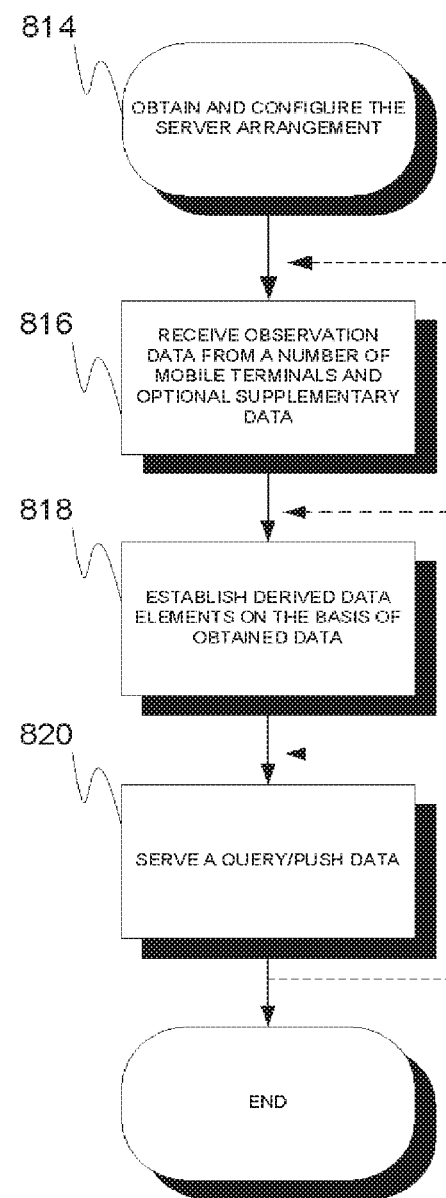
FIG. 8 represents a flow diagram of a method in accordance with the present disclosure to be performed by the server arrangement.

FIG. 8 is a flow diagram of an example of a method in accordance with the present disclosure.

At 814 a server arrangement in accordance with an example of the present disclosure is obtained and configured, for example via installation and execution of related software, for managing observation data of wireless devices. At 816 observation (raw) data is obtained from a number of wireless devices. Optionally also supplementary data from a number of other external data sources (e.g. metadata providing location information) is received. At 818 a number of derived data elements are established on the basis of processing and analysing the obtained observation and optional supplementary data, said processing and analysing incorporating aggregation and optionally correlating, clustering, and/or factoring procedures, wherein at least one derived data element includes usage metrics with contextual and optionally technical dimension relative to one or more applications or other features of one or more wireless devices and users thereof. Both observation (raw) data and derived data may be stored in one or more locations at least functionally connected to the server arrangement and forming data storage. At 820 a data query formulated by an external entity is served through provision of derived information from one or more derived data elements according to the query parameters. Additionally or alternatively derived data may be provided to other elements by a push model. The broken line depicts the flexible repeatability of different phases. A skilled person realizes that the illustrated flow diagram is indeed merely an example and the nature and number of method steps, not forgetting the mutual order thereof, may be dynamically and/or use case—specifically adjusted.

The present disclosure thus describes an optimal technical architecture and a related method to automate the conversion of behavioural and contextual data into more meaningful information, such as desired statistics in the person-time-context-application space, depending on each example and use scenario of the disclosure.

As set forth herein, an example server arrangement (112, 234) for managing observation data of wireless devices, such as smartphones, includes a data input logic (300) for obtaining observation data from a number of wireless devices and optionally supplementary data from a number of other external data sources, the obtained data including behavioural, contextual, and optionally technical raw data relative to the wireless devices; a data mining logic (500) for establishing a number of derived data elements (116), such as data tables or databases, on the basis of processing and analyzing the obtained observation and optional supplementary data, said processing and analyzing incorporating data aggregation. At least one derived data element includes usage metrics with contextual and optionally technical dimension relative to one or more applications or other features of one or more wireless devices and users thereof, a data storage (400) for storing the obtained data (402) and the number of derived data elements (403); and a data distribution logic (600) for providing derived data to one or more other entities.

In some examples, the data distribution logic is configured to perform at least one action selected from: to serve a data query constructed by an external entity through provision of derived information from one or more derived data elements according to the query parameters, and to push derived information from one or more derived data elements to an external entity according to a predetermined push logic. In some examples, the server arrangement is configured to generate derived data for adapting a network service or an application of a wireless device according to the behavioural and/or contextual characteristics of the user of the wireless device determined on the basis of derived data elements. In some examples, the server arrangement is configured to generate derived data for personalized advertising from the standpoint of a user of a wireless device according to the behavioral and/or contextual characteristics of the user determined on the basis of derived data elements.

In some example, the server arrangement is configured to map an indication of wireless device platform and/or used application, the indication is received in said obtained data, to other, more generic indication of the platform and/or application so as to enable logical grouping of data associated similar platforms and/or applications together. In some examples, the server arrangement is configured to determine an intensity variable, being an activity indicator in time domain relative to a selected time unit for a wireless device user or a plurality of users in view of an application or an application category including a plurality of applications. In some examples, the server arrangement is configured to determine a usage frequency for an application. In some examples, the processing and analyzing includes at least one: correlation, clustering, and factoring. In some examples, the server arrangement is configured to apply a clustering algorithm on the obtained data for behavioural segmentation of wireless device users to form behaviorally coherent user groups, factor analysis to categorize applications and/or content, or pattern recognition to draw relationships between entities such as actions, users and/or applications. In some examples, the observation data includes: data relating to a communication action such as initiating a call, answering a call, writing, sending, receiving, or reading a message, sensor data, application usage data, microphone usage data, loudspeaker/audio output data such as music reproduction data, camera usage data, user input data, user interface usage data, calendar entry-related data, audio and/or video recording, location data, time data, identification data of a close device, device status data, cellular tower signal strength data, throughput rate data, signal-to-noise data, data on Internet usage, and data on data usage.

In some examples, the server arrangement is configured to determine descriptive behavioural statistics for a wireless device user or a group of users including location spread of communications actions, such as calls, relative to a communication action initiator, respondent, near-end and/or remote location. In some examples, the server arrangement is configured to determine usage intensity or frequency variables of an application or an application category and to build a derived factor on top thereof, such as one or more generic multimedia usage indices out of music, imaging and/or video application usage variables. In some examples, the server arrangement is configured to utilize, on the basis of available application usage information, application and/or other activity execution start and stop times for the calculation of usage session durations in view of a number of first type of applications or activities, such as music players, which are often used such that application runs on the background and the overall activity on a user interface level is lower, and to determine usage session durations for a second type of applications or activities, such as a document viewing application, from the user interface level information.

In some examples, the server arrangement is configured to determine a statistical model of usage behavior to provide an estimate for a user's or a user group's status at a particular instant in view of location and/or usage of an application or other wireless device feature. In some examples, the server arrangement is configured to enrich the observation data with said supplementary data.

An example method for cultivating observation data provided by a number of wireless devices includes obtaining and storing (816) observation data from a number of wireless devices and optionally supplementary data from a number of other external data sources, the obtained data including behavioural, contextual, and optionally technical raw data relative to the wireless devices; establishing and storing (818) a number of derived data elements on the basis of processing and analyzing the obtained observation and optional supplementary data, said processing and analyzing incorporating data aggregation. At least one derived data element includes usage metrics with contextual and optionally technical dimension relative to one or more applications or other features of one or more wireless devices and users thereof. The example method includes providing derived data (820) from one or more derived data elements to one or more other entities.

In some examples, the computer software includes code means adapted, when run on a computer, to execute the example methods disclosed herein. In some examples, a carrier medium includes computer software to implement the examples disclosed herein. In some examples, the server arrangement is configured to generate derived data for adapting a network service or an application of a wireless device according to the behavioural and/or contextual characteristics of the user of the wireless device determined on the basis of derived data elements. In some examples, the server arrangement is configured to generate derived data for adapting a network service or an application of a wireless device according to the behavioural and/or contextual characteristics of the user of the wireless device determined on the basis of derived data elements.

The scope of the disclosure can be found in the following claims. Notwithstanding the various examples described hereinbefore in detail, a person skilled in the art will understand that different modifications may be introduced to the explicitly disclosed solutions without diverging from the fulcrum of the present disclosure as set forth in this text and defined by the claims.

What is claimed is:
1. A computing system comprising:
at least one processor; and
a non-transitory computer-readable storage medium, having stored thereon program instructions that, upon execution by the at least one processor, cause performance of a set of operations comprising:
  determining a plurality of usage metrics for a plurality of applications based on data collected from a plurality of wireless devices;
  generating a model based on the plurality of usage metrics, the model including a plurality of nodes and a plurality of weights, respective nodes of the plurality of nodes representing users of the plurality of wireless devices, respective weights of the plurality of weights representing respective correlation coefficients between the respective nodes, the plurality of weights determined based on the plurality of usage metrics; and
  causing transmission of an advertisement to a first one of the plurality of wireless devices or a second wireless device, the second wireless device different than the plurality of wireless devices, the advertisement selected based on the model and a usage metric retrieved from the first one of the plurality of wireless devices or the second wireless device.

2. The computing system of claim 1, wherein the set of operations further comprise aggregating the data to determine the plurality of usage metrics.

3. The computing system of claim 1, wherein the set of operations further comprise analyzing at least one of (a) respective durations of usage of the plurality of applications per time unit, (b) respective numbers of sessions of the plurality of applications per time unit, or (c) respective numbers of events associated with the plurality of applications per time unit to generate the model, the plurality of usage metrics including the at least one of the respective durations, the respective numbers of sessions, or the respective numbers of events.

4. The computing system of claim 1, wherein the respective nodes of the plurality of nodes represent respective behaviorally coherent groups, and wherein the set of operations further comprise clustering the users to form the respective behaviorally coherent groups based on a shared usage metric between respective ones of the users.

5. The computing system of claim 4, wherein the set of operations further comprise:
  iteratively computing a plurality of modularity scores for a plurality of combinations of a first behaviorally coherent group of the respective behaviorally coherent groups and other behaviorally coherent groups of the respective behaviorally coherent groups; and
  iteratively generating a combination of the first behaviorally coherent group with another behaviorally coherent group, the combination corresponding to one of the plurality of combinations having a highest modularity score of the plurality of modularity scores.

6. The computing system of claim 1, wherein a first usage metric of the plurality of usage metrics includes at least one of a usage intensity of a first one of the plurality of applications, a usage frequency of the first one of the plurality of applications, or an adoption rate of the first one of the plurality of applications, the usage intensity including at least one of a duration of usage of the first one of the plurality of applications per time unit, a number of sessions of the first one of the plurality of applications per time unit, or a number of events associated with the first one of the plurality of applications per time unit.

7. The computing system of claim 1, wherein the respective weights of the plurality of weights include multiple weights.

8. A non-transitory computer-readable storage medium, having stored thereon program instructions that, when executed by a processor, cause performance of a set of operations comprising:
  determining a plurality of usage metrics for a plurality of mobile device applications based on data collected from a plurality of mobile devices;
  determining a plurality of weights based on the plurality of usage metrics;
  generating a model, the model including a plurality of nodes and the plurality of weights, respective nodes of the plurality of nodes representing users of the plurality of mobile devices, respective weights of the plurality of weights representing respective correlation coefficients between the respective nodes; and
  causing transmission of an advertisement to a first one of the plurality of mobile devices or a second mobile device, the second mobile device different than the plurality of mobile devices, the advertisement selected based on the model and a usage metric retrieved from the first one of the plurality of mobile devices or the second mobile device.

9. The non-transitory computer-readable storage medium as defined in claim 8, wherein the set of operations further comprise aggregating the data to determine the plurality of usage metrics.

10. The non-transitory computer-readable storage medium as defined in claim 8, wherein the set of operations further comprise analyzing at least one of (a) respective usage durations of the plurality of mobile device applications per time unit, (b) respective session counts of the plurality of mobile device applications per time unit, or (c) respective event counts associated with the plurality of mobile device applications per time unit to generate the model, the plurality of usage metrics including the at least one of the respective usage durations, the respective session counts, or the respective event counts.

11. The non-transitory computer-readable storage medium as defined in claim 8, wherein the respective nodes of the plurality of nodes represent respective behaviorally coherent groups, and wherein the set of operations further comprise clustering the users to form the respective behaviorally coherent groups, the respective behaviorally coherent groups clustered by a shared usage metric of users in the respective behaviorally coherent groups.

12. The non-transitory computer-readable storage medium as defined in claim 11, wherein the set of operations further comprise:
  iteratively computing a plurality of modularity scores for a plurality of combinations of a first behaviorally coherent group of the respective behaviorally coherent groups and other behaviorally coherent groups of the respective behaviorally coherent groups; and
  iteratively generating a combination of the first behaviorally coherent group with another behaviorally coherent group, the combination corresponding to one of the plurality of combinations having a highest modularity score of the plurality of modularity scores.

13. The non-transitory computer-readable storage medium as defined in claim 8, wherein a first usage metric of the plurality of usage metrics includes at least one of a usage intensity of a first one of the mobile device applications, a usage frequency of the first one of the mobile device applications, or an adoption rate of the first one of the mobile device applications.

14. The non-transitory computer-readable storage medium as defined in claim 8, wherein the respective weights of the plurality of weights include multiple weights.

15. A method comprising:
 determining a plurality of usage metrics for a plurality of user applications based on data collected from a plurality of smartphones;
 generating, by executing an instruction with at least one processor, a model based on the plurality of usage metrics, the model including a plurality of nodes and a plurality of weights, respective nodes of the plurality of nodes representing users of the plurality of smartphones, respective weights of the plurality of weights representing respective correlation coefficients between the respective nodes, the plurality of weights determined based on the plurality of usage metrics; and
 transmitting, with at least one transmission circuit, an advertisement to a first one of the plurality of smartphones or a second smartphone, the second smartphone different than the plurality of smartphones, the advertisement selected based on the model and a usage metric retrieved from the first one of the plurality of smartphones or the second smartphone.

16. The method of claim 15, further including aggregating the data to determine the plurality of usage metrics.

17. The method of claim 15, further including analyzing at least one of (a) respective usage periods of the plurality of user applications per time unit, (b) respective session counts of the plurality of user applications per time unit, or (c) respective event counts associated with the plurality of user applications per time unit to generate the model, the plurality of usage metrics including the at least one of the respective usage periods, the respective session counts, or the respective event counts.

18. The method of claim 15, wherein the respective nodes of the plurality of nodes represent respective behaviorally coherent groups, and the method further including:
 generating clusters of the users based on a shared usage metric associated with respective ones the users; and
 defining the respective behaviorally coherent groups based on the clusters.

19. The method of claim 18, further including:
 iteratively computing a plurality of modularity scores for a plurality of combinations of a first behaviorally coherent group of the respective behaviorally coherent groups and other behaviorally coherent groups of the respective behaviorally coherent groups; and
 iteratively generating a combination of the first behaviorally coherent group with another behaviorally coherent group, the combination corresponding to one of the plurality of combinations having a highest modularity score of the plurality of modularity scores.

20. The method of claim 15, wherein a first usage metric of the plurality of usage metrics includes at least one of a usage intensity of a first one of the user applications, a usage frequency of the first one of the user applications, or an adoption rate of the first one of the user applications.

21. The method of claim 15, wherein the respective weights of the plurality of weights include multiple weights.

* * * * *